US012124183B2

(12) United States Patent
Kobayashi et al.

(10) Patent No.: US 12,124,183 B2
(45) Date of Patent: Oct. 22, 2024

(54) IMAGE FORMING APPARATUS CAPABLE OF SUPPRESSING AN IMPROPER CHARGE RESULTING FROM TONER BEING MOVED FROM A TRANSFER MEMBER TO A PHOTOSENSITIVE MEMBER

(71) Applicant: CANON KABUSHIKI KAISHA, Tokyo (JP)

(72) Inventors: Shinsuke Kobayashi, Kanagawa (JP); Kensuke Umeda, Kanagawa (JP); Ai Suzuki, Tokyo (JP); Kazuhiro Funatani, Kanagawa (JP); Shuichi Tetsuno, Kanagawa (JP); Toshihiko Takayama, Kanagawa (JP); Jun Hara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/335,237

(22) Filed: Jun. 15, 2023

(65) Prior Publication Data

US 2023/0324825 A1 Oct. 12, 2023

Related U.S. Application Data

(62) Division of application No. 17/515,636, filed on Nov. 1, 2021, now Pat. No. 11,703,775.

(30) Foreign Application Priority Data

Dec. 18, 2020 (JP) ................................ 2020-210846

(51) Int. Cl.
*G03G 15/02* (2006.01)
*G03G 15/06* (2006.01)
(Continued)

(52) U.S. Cl.
CPC ..... *G03G 15/0266* (2013.01); *G03G 15/0225* (2013.01); *G03G 15/065* (2013.01); *G03G 15/1675* (2013.01); *G03G 21/0064* (2013.01)

(58) Field of Classification Search
CPC ............ G03G 15/1675; G03G 15/168; G03G 21/0035; G03G 21/0064
See application file for complete search history.

(56) References Cited

U.S. PATENT DOCUMENTS 4,042,962 A 8/1977 Yamaji
5,884,121 A 3/1999 Kyung
(Continued)

FOREIGN PATENT DOCUMENTS

CN 101008813 A 8/2007
CN 101840185 A 9/2010
(Continued)

OTHER PUBLICATIONS

U.S. Appl. No. 17/531,924, filed Nov. 22, 2021 (First Named Inventor: Kazuhiro Funatani).
(Continued)

*Primary Examiner* — Gregory H Curran
(74) *Attorney, Agent, or Firm* — Venable LLP

(57) ABSTRACT

An image forming apparatus includes a photosensitive member, a charging member, an electrostatic image forming portion, a developing member, a transfer member, a transfer voltage source, a brush member, a brush voltage source, and a controller capable of executing a cleaning operation. The controller carries out control so that the cleaning operation includes a first operation in which a potential difference is formed between the transfer member and the photosensitive member so that toner charged to a normal charge polarity is moved from the transfer member toward the photosensitive member, and a second operation in which a potential dif-
(Continued)

ference is formed between the brush member and the photosensitive member so that the toner charged to the normal charge polarity is moved from the photosensitive member toward the brush member.

12 Claims, 15 Drawing Sheets

(51) Int. Cl.
*G03G 15/16* (2006.01)
*G03G 21/00* (2006.01)

(56) References Cited

U.S. PATENT DOCUMENTS

| | | | |
|---|---|---|---|
| 6,584,292 | B2 | 6/2003 | Sasai |
| 6,898,393 | B2 | 5/2005 | Kawamura |
| 7,050,730 | B2 | 5/2006 | Sasai |
| 7,860,420 | B2 | 12/2010 | Mochizuki |
| 8,346,113 | B2 | 1/2013 | Shibuya et al. |
| 9,176,436 | B2 | 11/2015 | Katagiri et al. |
| 9,201,377 | B2 | 12/2015 | Miyahara et al. |
| 9,341,988 | B2 | 5/2016 | Funatani et al. |
| 9,599,935 | B2 | 3/2017 | Asai et al. |
| 10,073,383 | B2 | 9/2018 | Kobayashi et al. |
| 10,386,755 | B2 | 8/2019 | Kobayashi et al. |
| 2021/0382430 | A1 | 12/2021 | Funatani et al. |

FOREIGN PATENT DOCUMENTS

| | | | |
|---|---|---|---|
| CN | 103907064 | A | 7/2014 |
| CN | 106560746 | A | 4/2017 |
| CN | 110244531 | A | 9/2019 |
| JP | H06-222703 | A | 8/1994 |
| JP | H08-160812 | A | 6/1996 |
| JP | H09-218566 | A | 8/1997 |
| JP | 2002-258639 | A | 9/2002 |
| JP | 2004-085783 | A | 3/2004 |
| JP | 2004-212854 | A | 7/2004 |
| JP | 2004-219716 | A | 8/2004 |
| JP | 2005-250380 | A | 9/2005 |
| JP | 2005-265906 | A | 9/2005 |
| JP | 2005-308902 | A | 11/2005 |
| JP | 2007-057562 | A | 3/2007 |
| JP | 2008-032851 | A | 2/2008 |
| JP | 2010-014982 | A | 1/2010 |
| JP | 2010-032586 | A | 2/2010 |
| JP | 2010-224402 | A | 10/2010 |
| JP | 2014-029371 | A | 2/2014 |
| JP | 2017-058661 | A | 3/2017 |
| KR | 20010054300 | A | 7/2001 |
| KR | 10-0476966 | B1 | 3/2005 |

OTHER PUBLICATIONS

Office Action dated Apr. 7, 2024, in Chinese Patent Application No. 202111525192.4.
Jul. 9, 2024 Japanese Official Action in Japanese Patent Appln. No. 2020-210846.
Sep. 9, 2024 Chinese Official Action in Chinese Patent Appln. No. 202111525192.4.

IMAGE FORMING APPARATUS CAPABLE OF SUPPRESSING AN IMPROPER CHARGE RESULTING FROM TONER BEING MOVED FROM A TRANSFER MEMBER TO A PHOTOSENSITIVE MEMBER

This is a divisional of U.S. patent application Ser. No. 17/515,636, filed Nov. 1, 2021.

FIELD OF THE INVENTION AND RELATED ART

The present invention relates to an image forming apparatus, such as a printer, a copying machine, or a facsimile machine, of an electrophotographic type.

In the image forming apparatus of the electrophotographic type, a surface of a rotatable photosensitive member such as a photosensitive drum is electrically charged uniformly, and the charged surface of the photosensitive member is exposed to light depending on image information, so that an electrostatic image is formed on the photosensitive member. Thereafter, the electrostatic image on the photosensitive member is developed by being supplied with toner, so that a toner image is formed on the photosensitive member. Then, the toner image on the photosensitive member is transferred onto a recording material such as paper. The toner image on the photosensitive member is transferred onto the recording material passing through a transfer portion by applying a voltage to a transfer member forming the transfer portion in contact with the surface of the photosensitive member. Further, toner (transfer residual toner) remaining on the photosensitive member after the transfer is removed and collected from the photosensitive member.

As a charging type in which the surface of the photosensitive member is charged, there is a type in which a charging member such as an electrostatic charging roller is contacted to the surface of the photosensitive member and a voltage is applied to this charging member and thus a charging process is carried out. This type has been widely used from the viewpoints of environmental responsiveness (low ozone generation), space efficiency, charge stability, and the like. However, in this type, the transfer residual toner is deposited on the charging member in the case where the transfer residual toner exists locally in a large amount on the photosensitive member or in the like case, so that the charging process of the surface of the photosensitive member becomes non-uniform in some instances. For that reason, a means for dispersing the transfer residual toner on the photosensitive member is provided in some instances so that the transfer residual toner does not exist locally in the large amount.

In Japanese Laid-Open Patent Application 2010-14982, a constitution in which a brush member is provided as a depositing member for depositing the transfer residual toner on the photosensitive member in contact with the surface of the photosensitive member on a side downstream of the transfer portion and an upstream side of a charging portion with respect to a rotational direction of the photosensitive member is disclosed.

However, even in the case where such a constitution is employed, when a cleaning operation for (cleaning) a transfer member in which the toner deposited on the transfer member is moved from the transfer member to the photosensitive member during non-image formation is performed, the toner moved from the transfer member to the photosensitive member is non-uniformly deposited on the charging member in some instances.

The toner moved from the transfer member to the photosensitive member during the cleaning operation for the transfer member is charged to a normal polarity which is a charge polarity principally during development. This is because a voltage of a polarity opposite to the normal polarity of the toner is applied to the transfer member during image formation, and therefore, the toner charged to the normal polarity on the photosensitive member is electrostatically attracted to the transfer member. During the image formation, a "fog" such that the toner is deposited on the photosensitive member in a non-image region (non-exposure region) occurs in some instances, and of the toner causing this fog, the toner charged principally to the normal polarity is deposited and accumulated on the transfer member in a sheet (paper) interval or during pre-rotation, or the like.

Further, on the transfer member, an impurity (foreign matter), other than the toner, such as fibers of paper powder from paper principally used as the recording material, or dust is also deposited. The toner accumulated on the transfer member is mixed with the impurity such as the paper powder, whereby during a cleaning operation for the transfer member, the toner is moved from the transfer member to the photosensitive member in an agglomerated state or in a state in which the toner is liable to agglomerate. Then, when a mixture of the toner with the impurity such as the paper powder passes through the brush member without being dispersed by the brush member, the toner is physically rubbed off from the surface of the photosensitive member by the charging member, whereby the toner is non-uniformly deposited on the charging member in some instances. By this, locally improper charge of the photosensitive member is caused, so that an image defect such as (image) density non-uniformity occurs in some instances.

SUMMARY OF THE INVENTION

A principal object of the present invention is to provide an image forming apparatus capable of suppressing the improper charge resulting from the toner moved from the transfer member onto the photosensitive member during the cleaning operation for cleaning the transfer member.

According to an aspect of the present invention, there is provided an image forming apparatus comprising: a rotatable photosensitive member; a charging member forming a charging portion in contact with the photosensitive member and configured to electrically charge a surface of the photosensitive member at the charging portion; an electrostatic image forming portion configured to form an electrostatic image on the photosensitive member charged by the charging member; a developing device configured to form a toner image on the photosensitive member by supplying toner, charged to a normal polarity, to the electrostatic image; a transfer member forming a transfer portion in contact with the photosensitive member and configured to transfer the toner image from the photosensitive member onto a recording material passing through the transfer portion; a transfer voltage source configured to apply a voltage to the transfer member; a brush member forming a contact portion in contact with the photosensitive member on a side downstream of the transfer portion and an upstream side of the charging portion with respect to a rotational direction of the photosensitive member; a brush voltage source configured to apply a voltage to the brush member; and a controller capable of executing a cleaning operation for moving the toner, deposited on the transfer member, from the transfer member onto the surface of the photosensitive member when the recording material is absent at the transfer portion, wherein the controller carries out control so that the cleaning operation includes: a first operation in which a potential difference is formed between the transfer member and the photosensitive member so that the toner charged to the normal charge polarity is moved from the transfer member toward the photosensitive member, and a second operation in which a potential difference is formed between the brush member and the photosensitive member so that the toner charged to the normal charge polarity is moved from the photosensitive member toward the brush member.

Further features of the present invention will become apparent from the following description of exemplary embodiments with reference to the attached drawings.

Figure 2:
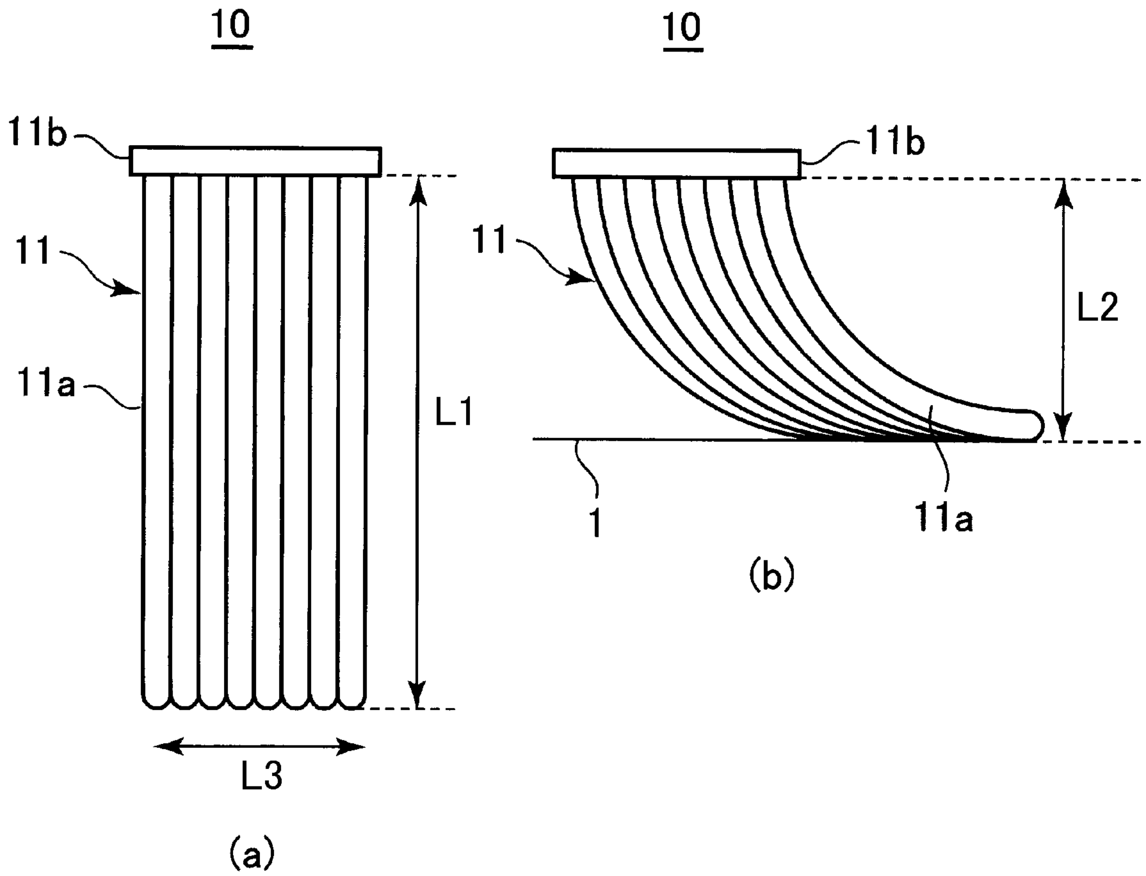

Parts (a) and (b) of FIG. 2 are schematic views of a brush member (fixed brush).

Figure 3:
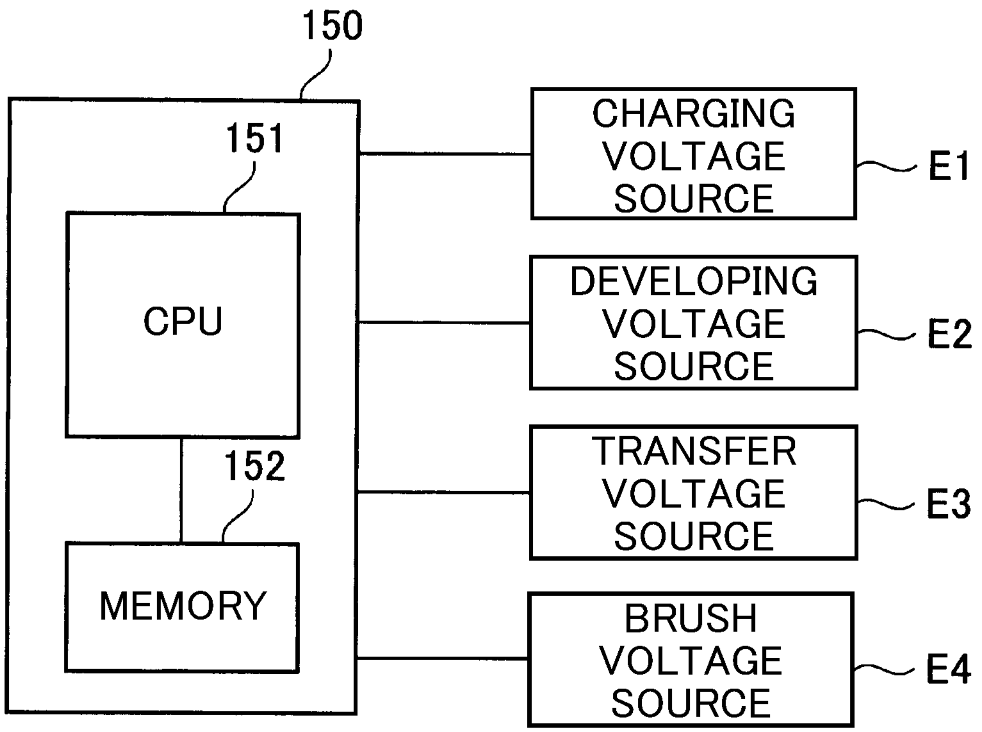

FIG. 3 is a schematic block diagram showing a control mode of the image forming apparatus.

Figure 4:
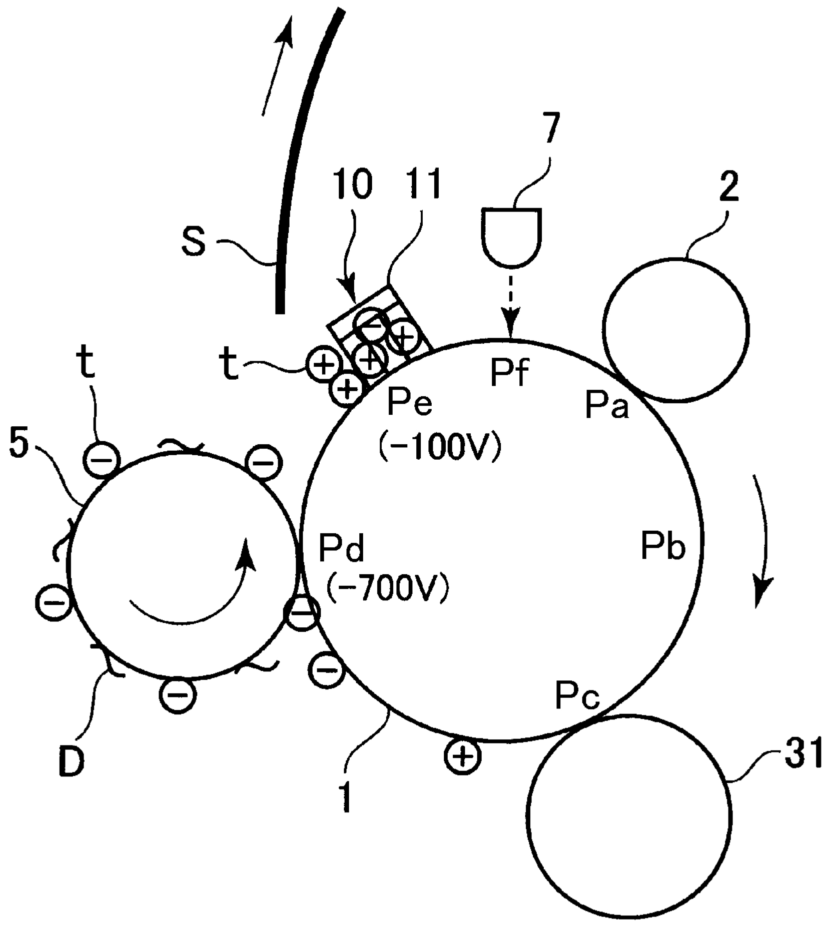

FIG. 4 is a schematic view showing a state around a photosensitive drum during a cleaning operation.

Figure 5:
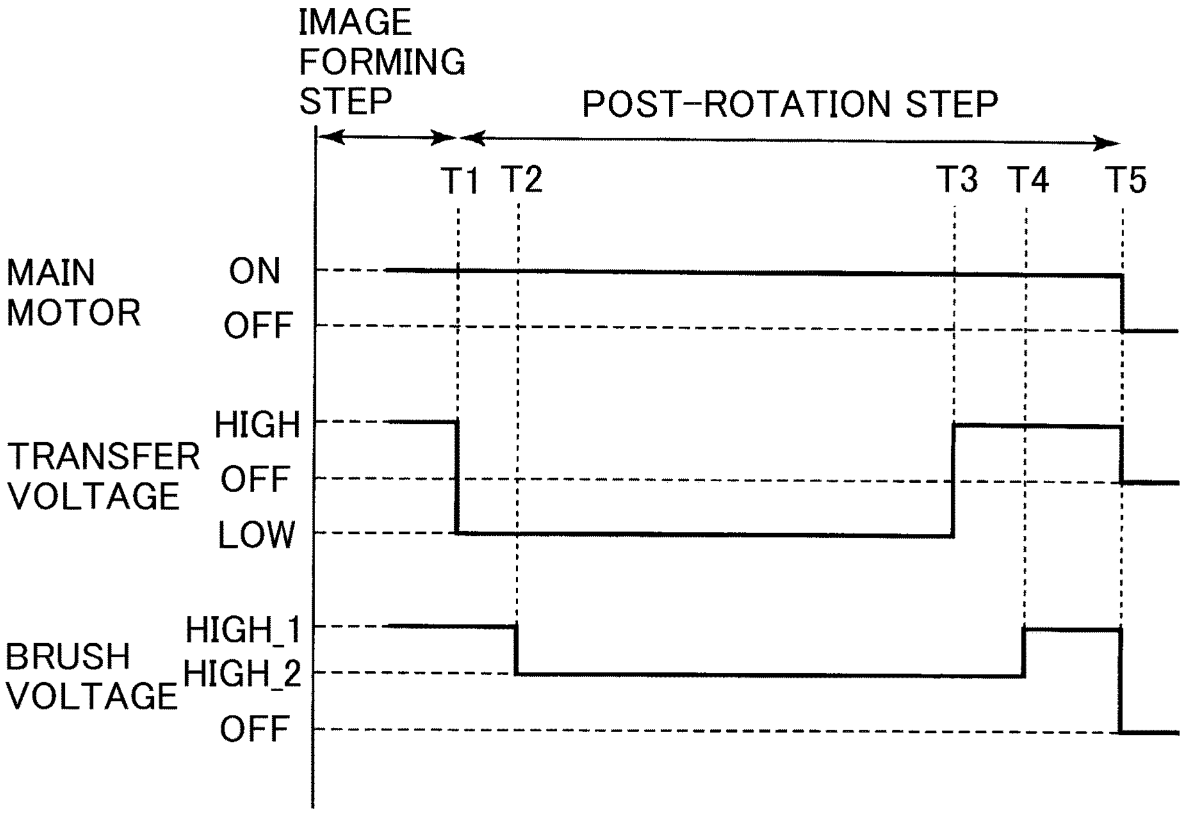

FIG. 5 is a timing chart of an example of the cleaning operation.

Figure 6:
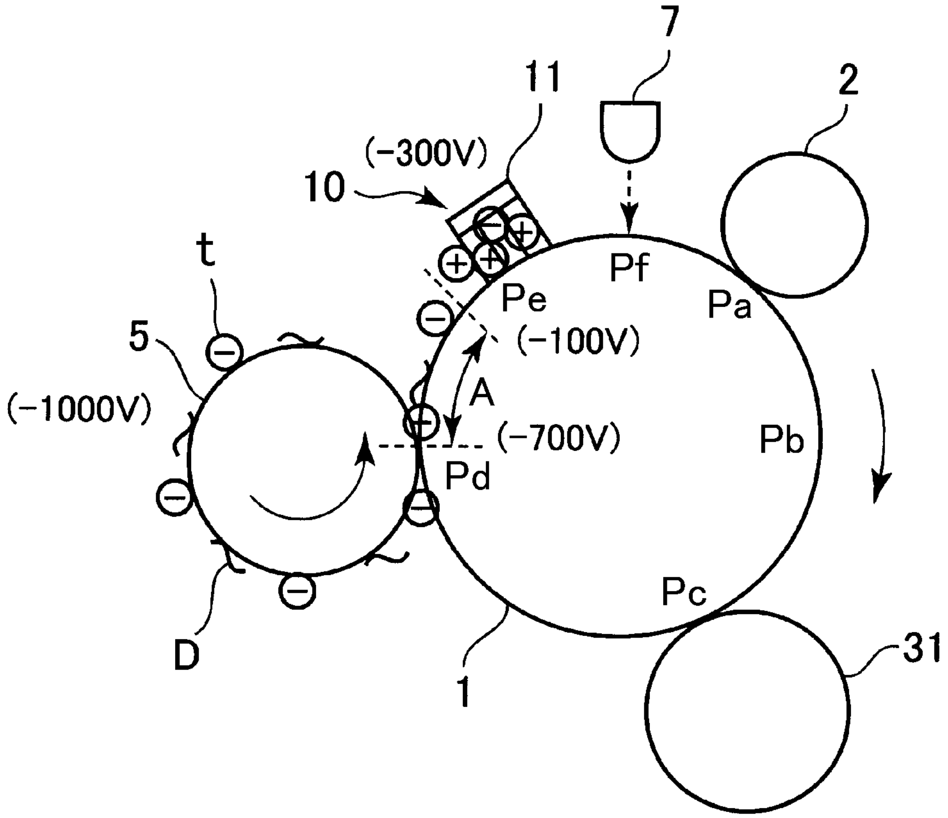

FIG. 6 is a schematic view showing the state around the photosensitive drum during the cleaning operation.

Figure 7:
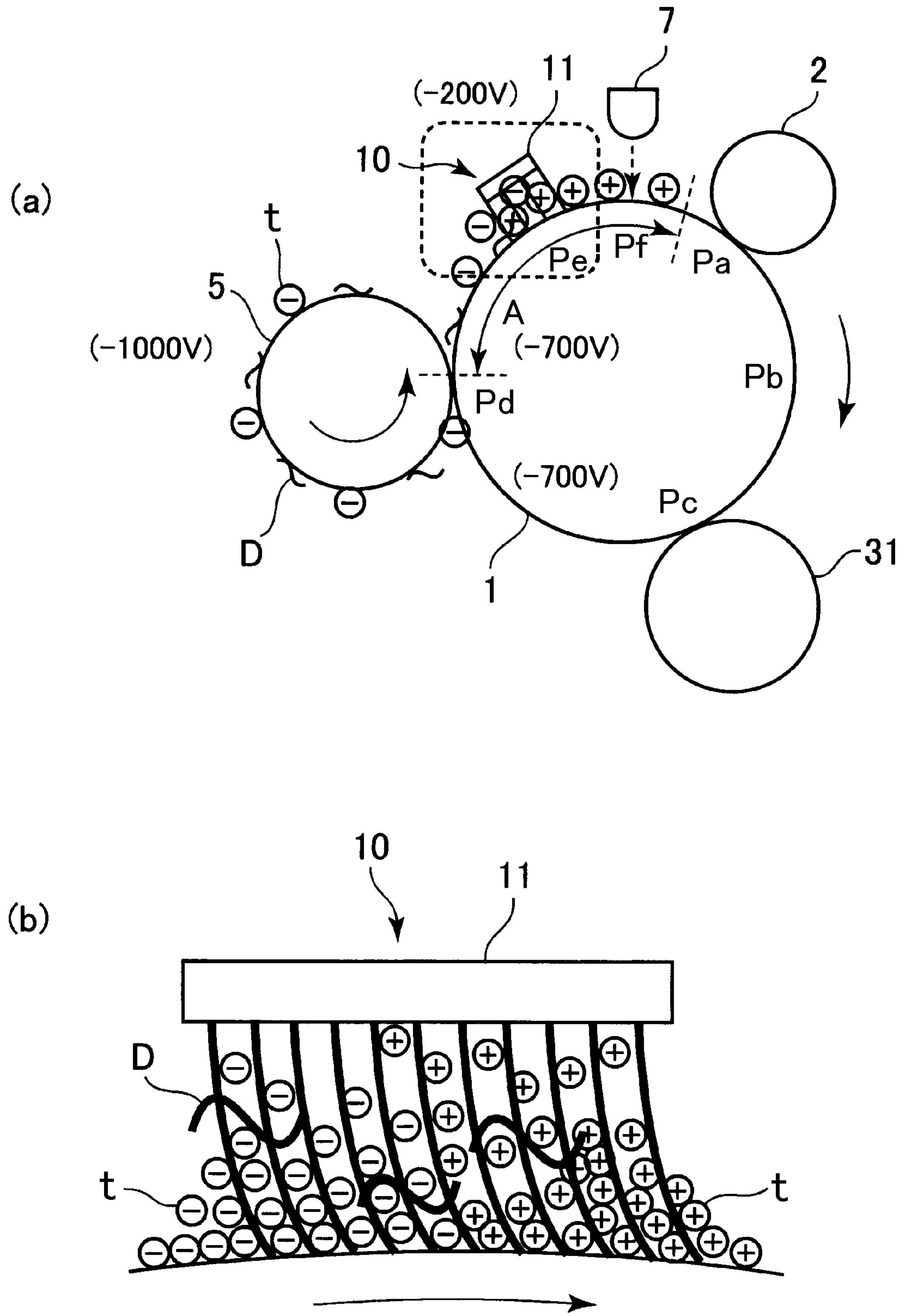

Parts (a) and (b) of FIG. 7 are schematic views showing a state around the photosensitive drum during the cleaning operation and a state of a brush member during the cleaning operation, respectively.

Figure 8:
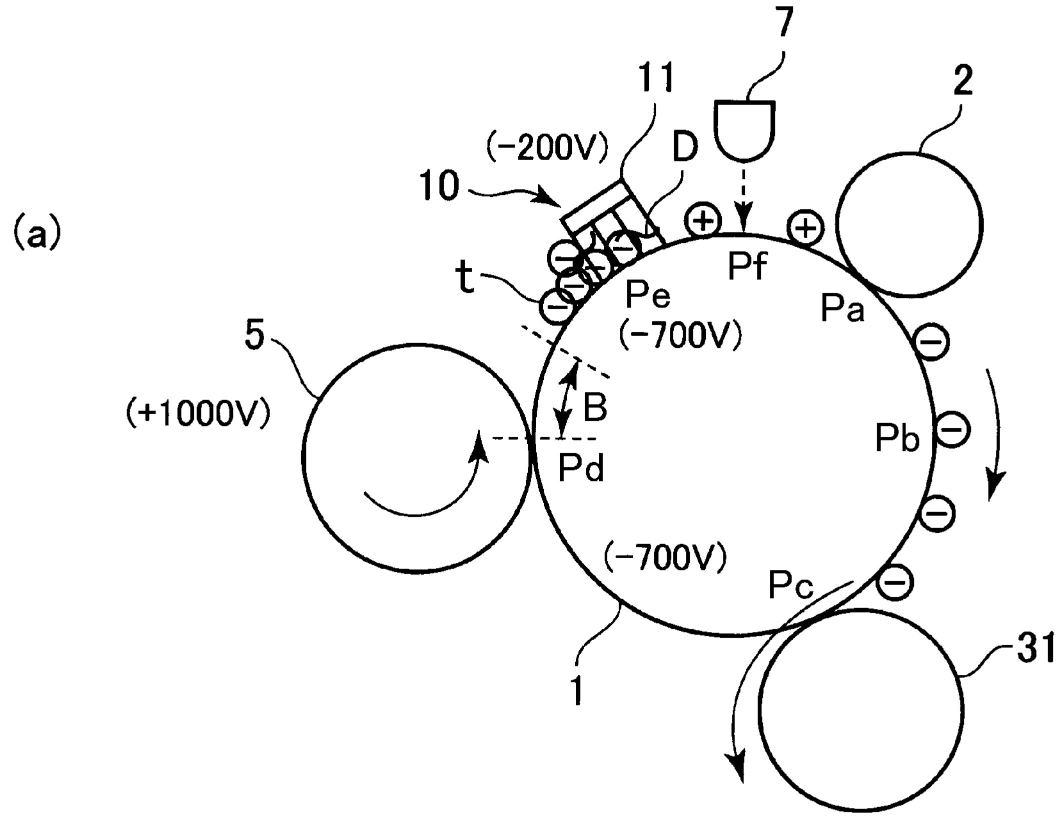
Figure 8:
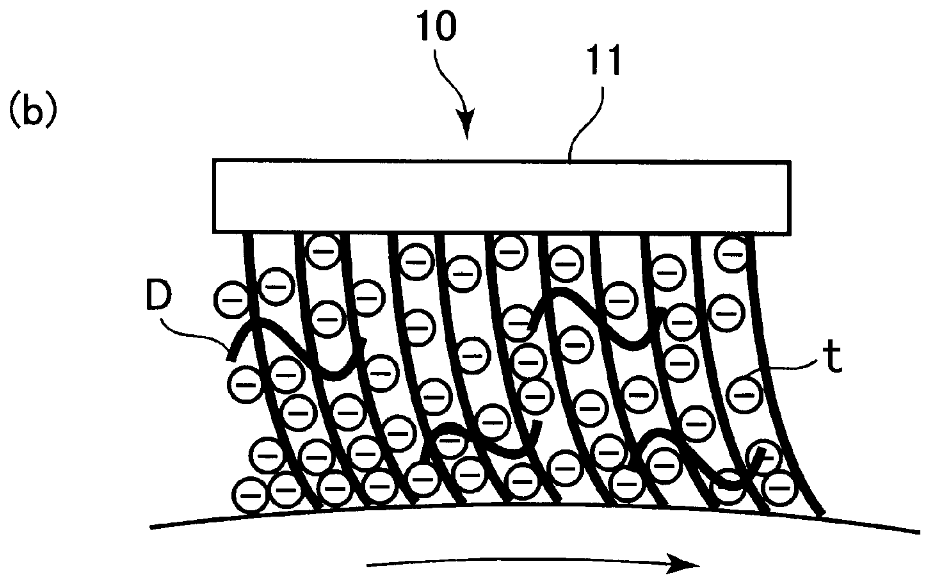

Parts (a) and (b) of FIG. 8 are schematic views showing a state around the photosensitive drum during the cleaning operation and a state of the brush member during the cleaning operation, respectively.

Figure 9:
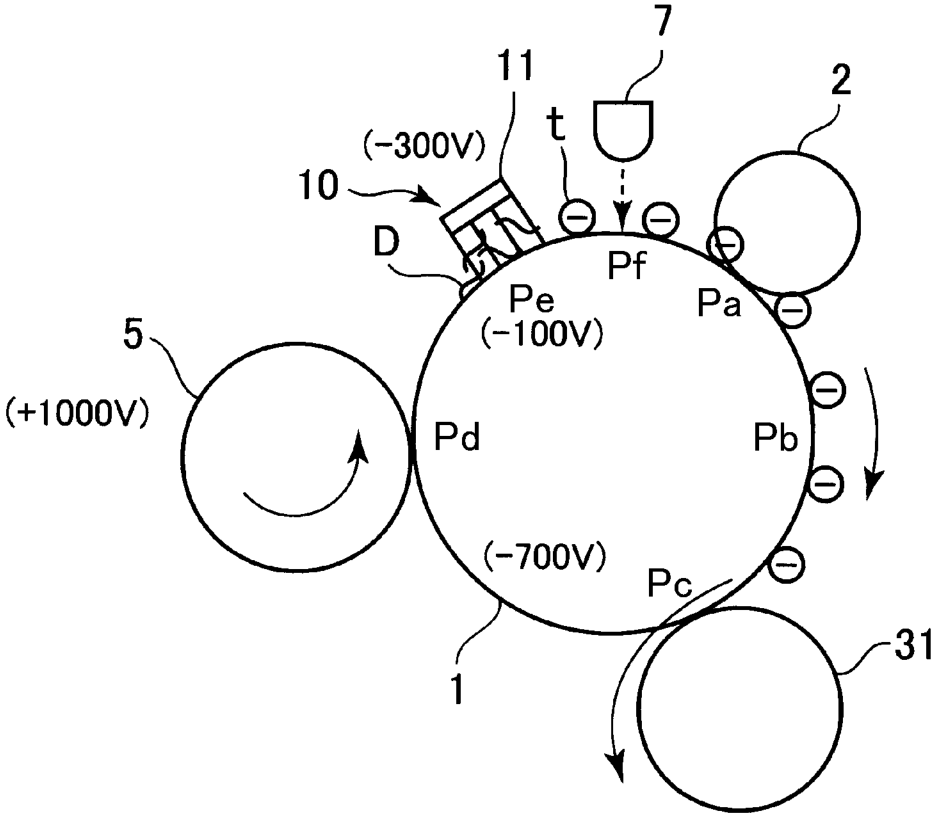

FIG. 9 is a schematic view showing a state around the photosensitive drum during the cleaning operation.

Figure 10:
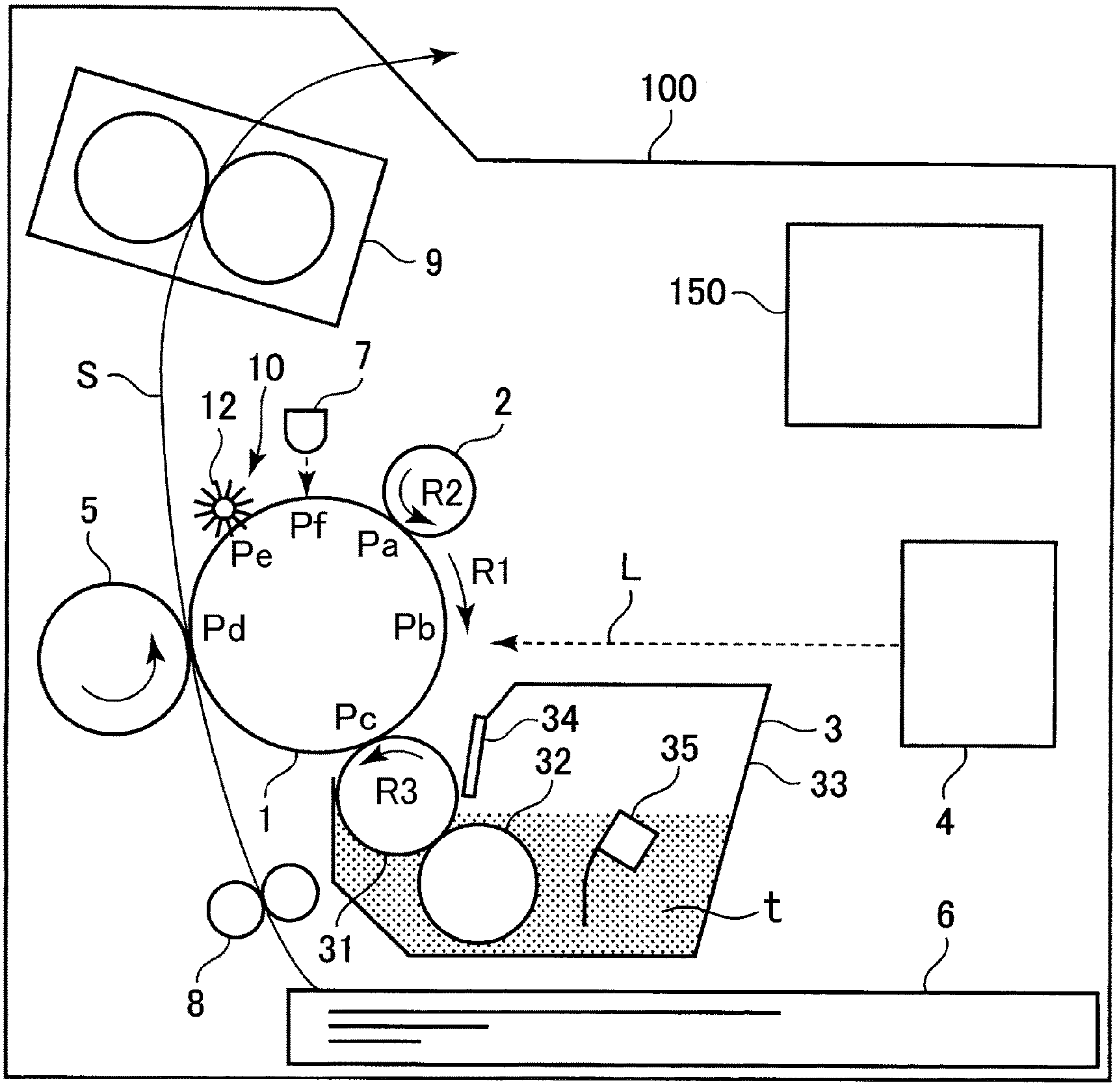

FIG. 10 is a schematic sectional view of an image forming apparatus according to another embodiment.

Figure 11:
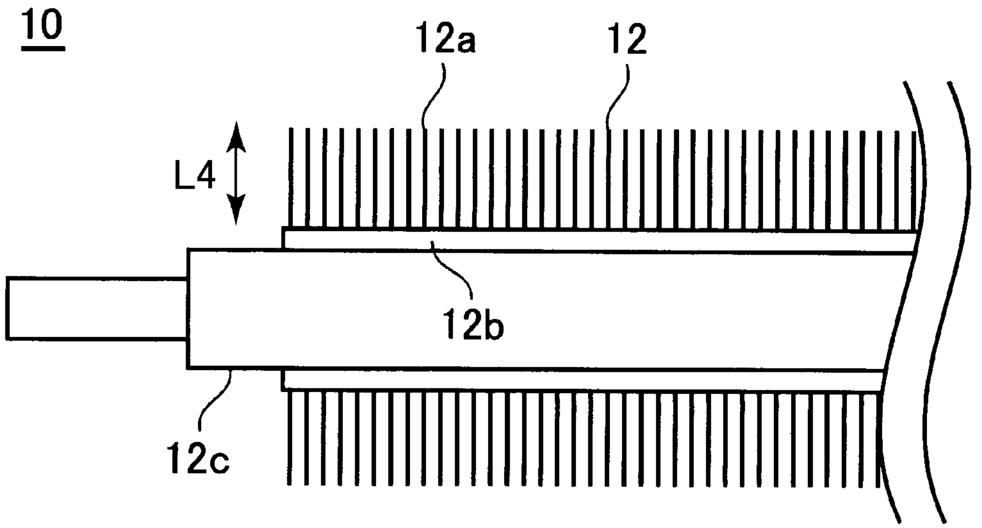

FIG. 11 is a schematic sectional view of a brush member (brush roller).

Figure 12:
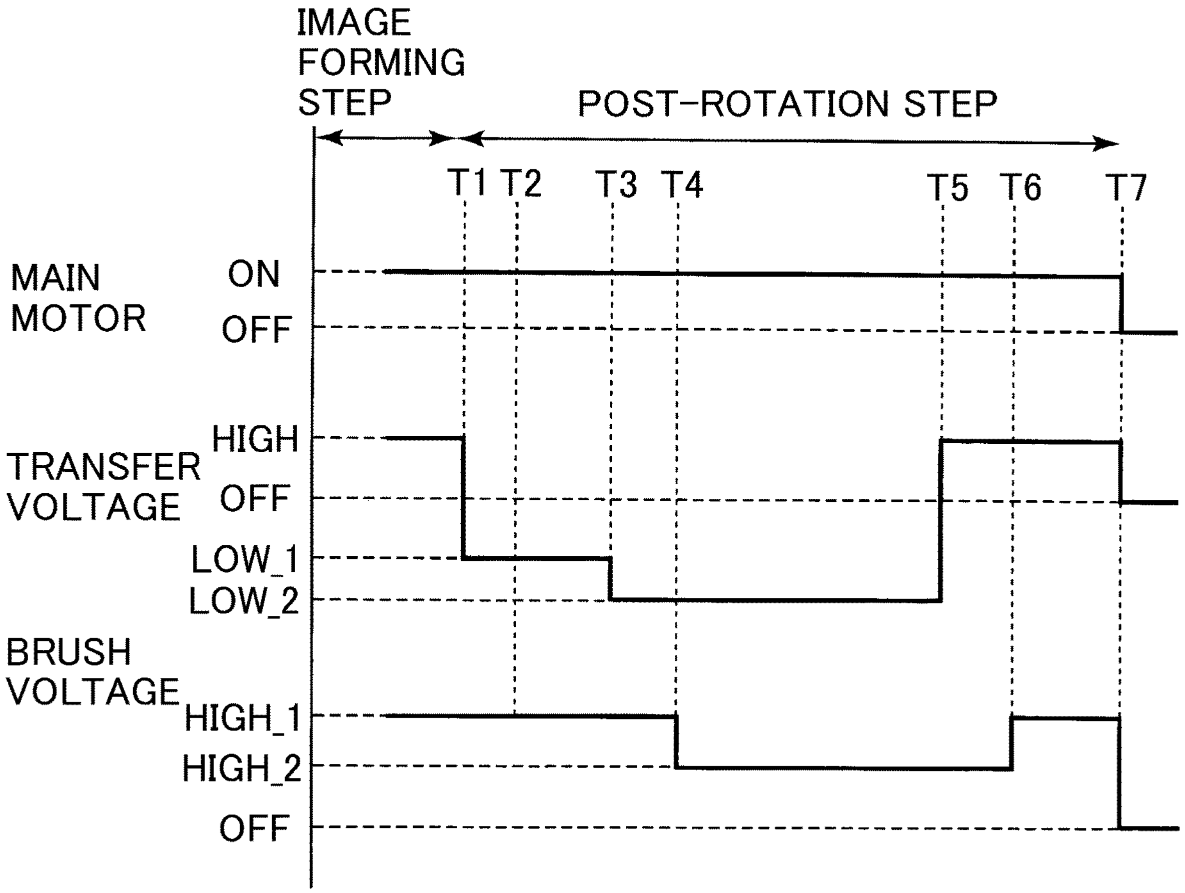

FIG. 12 is a timing chart of the cleaning operation in another embodiment.

Figure 13:
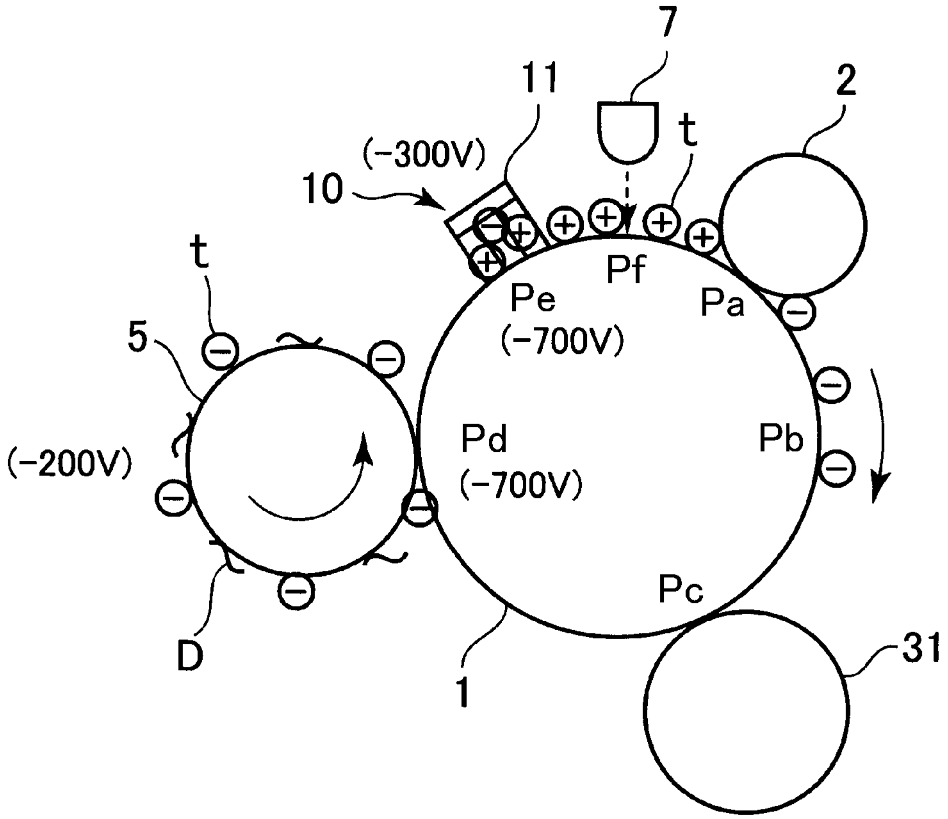

FIG. 13 is a schematic view showing a state around the photosensitive drum during the cleaning operation.

Figure 14:
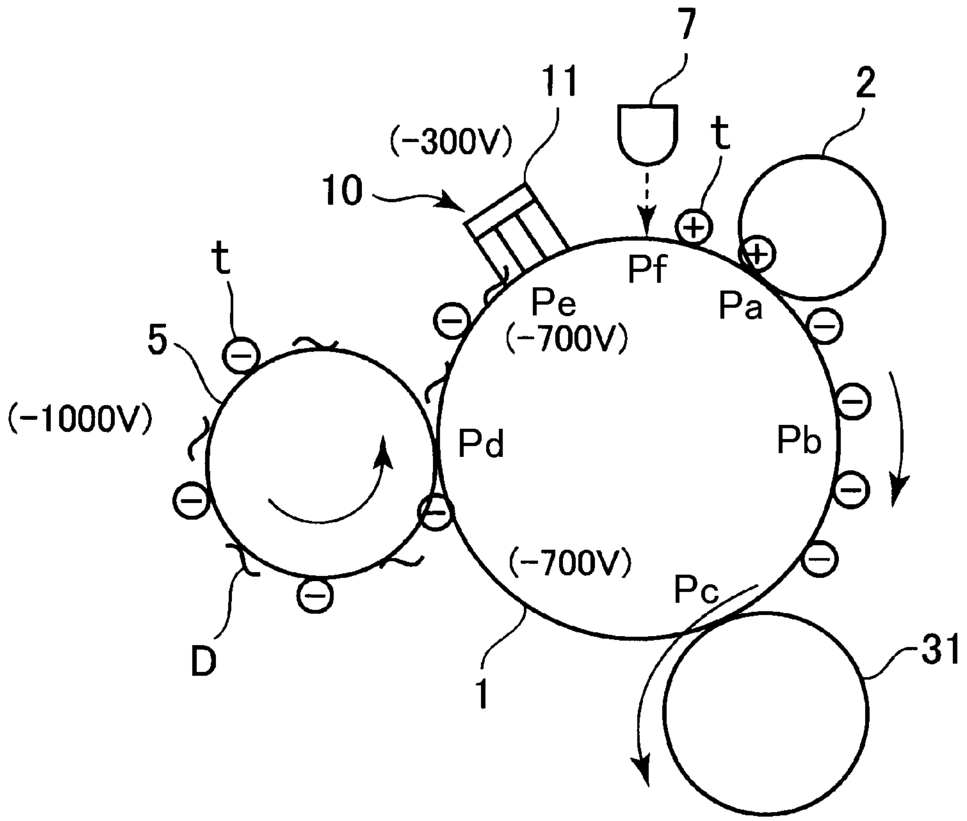

FIG. 14 is a schematic view showing a state around the photosensitive drum during the cleaning operation.

Figure 15:
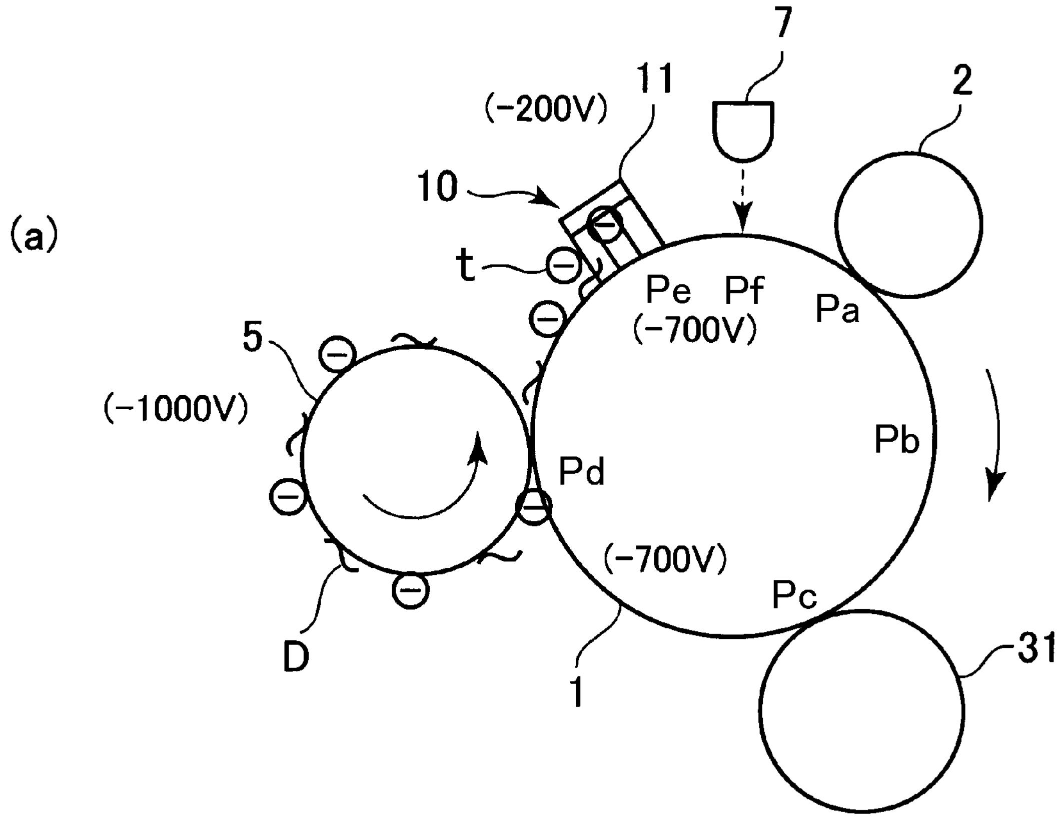
Figure 15:
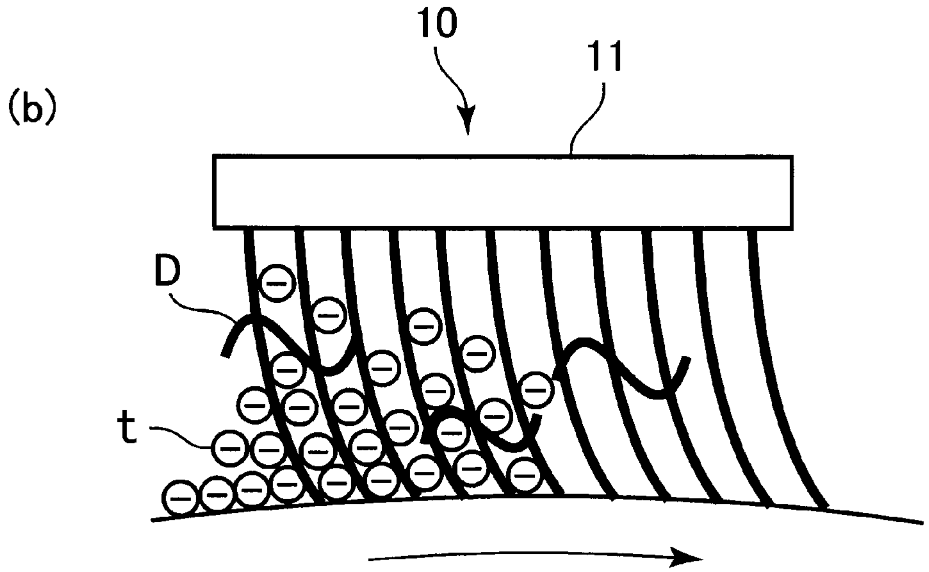

Parts (a) and (b) of FIG. 15 are schematic views showing a state around the photosensitive drum during the cleaning operation and a state of the brush member during the cleaning operation, respectively.

DESCRIPTION OF EMBODIMENTS

An image forming apparatus according to the present invention will be specifically described.

<Image Forming Apparatus>

Figure 1:
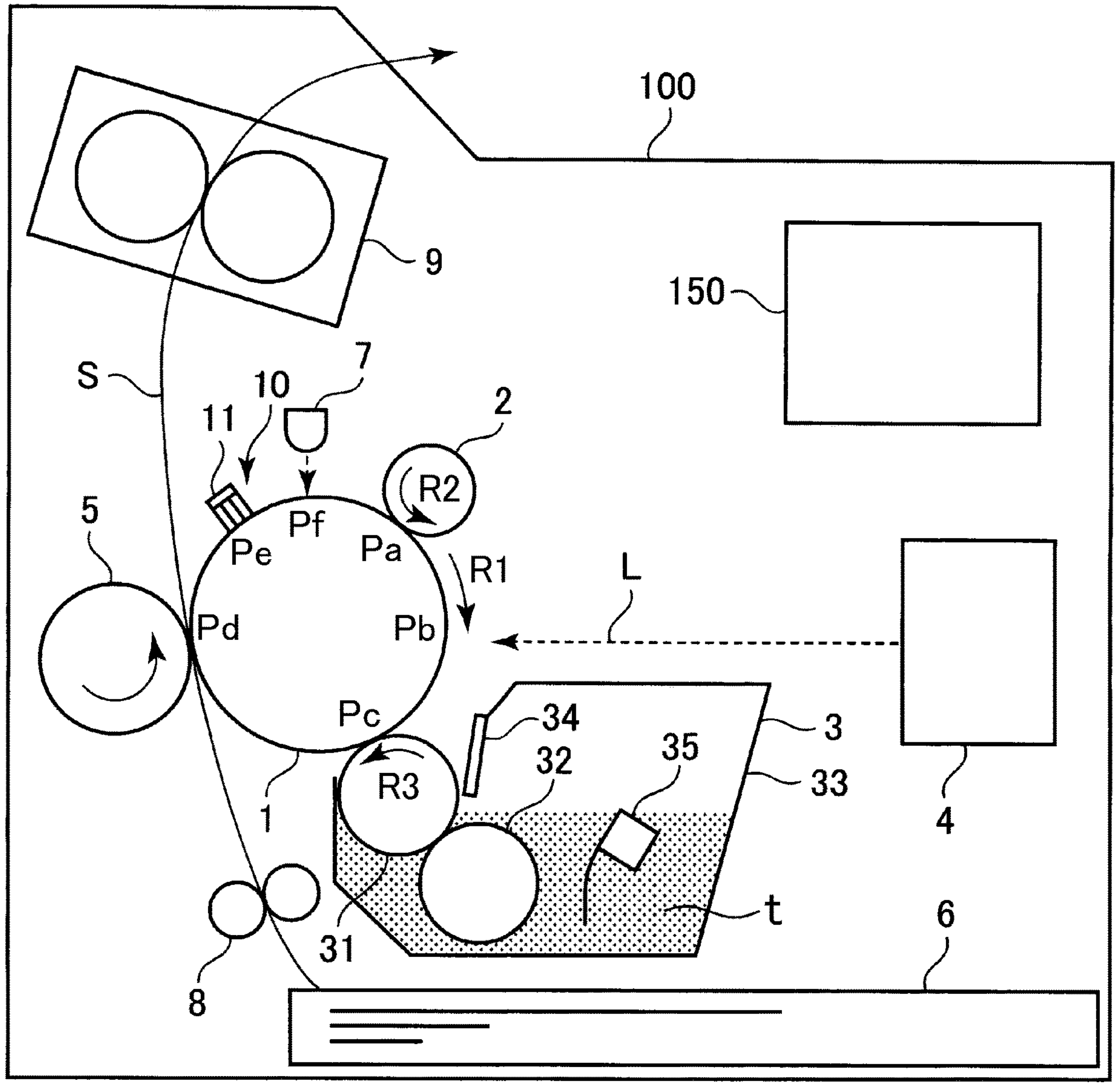
FIG. 1 is a schematic sectional view of an image forming apparatus.

FIG. 1 is a schematic sectional view of an image forming apparatus 100 of an embodiment 1. The image forming apparatus 100 of the embodiment 1 is a monochromatic laser beam printer employing a cleaner-less type and a contact charging type.

The image forming apparatus 100 includes a photosensitive drum 1 which is a rotatable drum-shaped (cylindrical) photosensitive member (electrophotographic photosensitive member) as an image bearing member. When an image outputting operation is started, the photosensitive drum 1 is rotationally driven in an arrow R1 direction (clockwise direction) in the figure by a driving motor (main motor) as a driving means. In the embodiment 1, an outer diameter of the photosensitive drum 1 is 24 mm, and a peripheral speed (surface movement speed) of the photosensitive drum 1 is 140 mm/sec.

A surface of the rotating photosensitive drum 1 is electrically charged uniformly to a predetermined potential of a predetermined polarity (negative in the embodiment 1) by a charging roller 2 which is a roller-shaped charging member as a charging means. The charging roller 2 is an elastic roller in which an electrostatic elastic layer is provided around a core metal. The charging roller 2 contacts the surface of the photosensitive drum 1 and forms a charging portion (charging position) Pa where the surface of the photosensitive drum 1 is charged. In the embodiment 1, the charging roller 2 is rotationally driven in an arrow R2 direction (counterclockwise direction) in the figure so that the photosensitive drum 1 and the charging roller 2 move in the same (normal) direction at a contact portion between the photosensitive drum 1 and the charging roller 2. Incidentally, a driving motor as an unshown driving means for driving the charging roller 2 may also be the main motor common to the driving means for the photosensitive drum 1 and the driving means for the charging roller 2. During a charging process, to the charging roller 2, a predetermined charging voltage (charging bias) is applied by a charging voltage source E1 (FIG. 3) as a charging voltage applying means. In the embodiment 1, during the charging process, to the charging roller 2, a DC voltage of a negative polarity is applied as the charging voltage. In the embodiment 1, this charging voltage is −1300 V as an example. By this, in the embodiment 1, the surface of the photosensitive drum 1 is uniformly charged to the dark portion potential Vd of −700 V. Incidentally, specifically, the charging roller 2 charges the surface of the photosensitive drum 1 by electric discharge generating at least one minute gap between itself and the photosensitive drum 1 formed on an upstream side and a downstream side of the contact portion with the photosensitive drum 1 with respect to a rotational direction of the photosensitive drum 1. However, herein, the contact portion between the charging roller 2 and the photosensitive drum 1 with respect to the rotational direction of the photosensitive drum 1 is regarded as the charging portion Pa and description will be made.

The charged surface of the photosensitive drum 1 is subjected to scanning exposure to light by an exposure device (laser scanner unit in the embodiment 1) 4 as an exposure means (electrostatic image forming portion). The exposure device 4 forms an electrostatic image on the photosensitive drum 1 by repeating exposure of the photosensitive drum 1 with respect to a main scan direction (rotational axis direction) by a laser beam L modulated depending on image data, in a sub-scan direction (surface movement direction). In the embodiment 1, the dark portion potential Vd of the surface of the photosensitive drum 1 formed by uniformly charging the photosensitive drum surface lowers in absolute value by exposing the photosensitive drum surface to light by the exposure device 4, and thus becomes a light portion potential Vl of −100 V. Here, with respect to the rotational direction of the photosensitive drum 1, a position where the surface of the photosensitive drum 1 is exposed to light by the exposure device 4 is an exposure portion (exposure position) Pb.

The electrostatic image formed on the photosensitive drum 1 is developed (visualized) with toner t as a developer supplied by a developing device 3 as a developing means, so that a toner image (developer image) is formed on the photosensitive drum 1. In the embodiment 1, as the toner t, spherical non-magnetic toner (spherical toner) which is a non-magnetic one component developer of 6.4 μm in average particle size and 0.98 in average circularity is used. The toner t used in the embodiment 1 may preferably be high in average circularity and may preferably be specifically 0.96 or more in average circularity. Incidentally, with the average circularity closer to 1.00, a shape of the toner t is closer to a spherical shape.

That is, the toner t used in the embodiment 1 may preferably have the average circularity of 0.96 or more and 1.00 or less. The average circularity is used as a simple method for representing a shape of particles quantitatively. Herein, the average circularity was acquired in the following manner.

First, measurement of the shape of particles is made by using a flow particle image analyzer ("FPIA-2100", manufactured by Toa Medical Electronics Co., Ltd.), and circularity is acquired by the following formula (1).

Circularity (Ci)=(circumferential length of circle having projection area equal to the number of particles)/(circumferential length of projection image of particles) (1)

Further, as shown in the following formula (2), a value obtained by dividing the sum of measured values of the circularity of all the particles by the number of all the particles is defined as average circularity.

$$\text{Average circularity} = (\overline{C}) = \sum_{i=m}^{m} Ci/m \qquad (2)$$

The developing device 3 includes a developing roller 31 as a developer carrying member, a toner supplying roller 32 as a developer supplying means, a developer accommodating chamber 33, a stirring member 35 as a stirring means, a developing blade 34 as a developer regulating means, and the like. The toner t accommodated in the developer accommodating chamber 33 is stirred by the stirring member 35 and is supplied to a surface of the developing roller 31 by the toner t supplying roller 32. The toner t supplied to the surface of the photosensitive drum 1 is uniformly formed in a thin layer by passing through a contact portion with the developing blade 34, and is charged to the negative polarity by triboelectric charge. The developing roller 31 contacts the surface of the photosensitive drum 1 and forms a developing portion (developing position) Pc where the toner t is supplied to the electrostatic image on the photosensitive drum 1. Herein, the contact portion between the developing roller 31 and the photosensitive drum 1 with respect to the rotational direction of the photosensitive drum 1 is the developing portion Pc. In the embodiment 1, the developing roller 31 is rotationally driven in an arrow R3 direction (counterclockwise direction) in the figure so that the photosensitive drum 1 and the developing roller 31 move in the same (normal) direction at a contact portion between the photosensitive drum 1 and the developing roller 31. Incidentally, a driving motor as an unshown driving means for driving the developing roller 31 may also be the main motor common to the driving means for the photosensitive drum 1 and the driving means for the charging roller 2. The toner t carried on the developing roller 31 moves from the developing roller 31 to the photosensitive drum 1 depending on the electrostatic image at the developing portion Pc. During development, to the developing roller 31, a predetermined developing voltage (developing bias) is applied by a developing voltage source E2 (FIG. 3) as a developing voltage applying means. In the embodiment 1, during the development, to the developing roller 31, a DC voltage of a negative polarity is applied as the developing voltage. In the embodiment 1, on an exposed portion (image portion) of the photosensitive drum 1 where an absolute value of a potential is lowered by being subjected to exposure to light after the photosensitive drum surface is uniformly charged, the toner t charged to the same polarity (negative in the embodiment 1) as a charge polarity of the photosensitive drum 1 deposits (reverse development). In the embodiment 1, a normal toner charge polarity ("normal polarity") which is a charging polarity of the toner t during development is the negative polarity. Incidentally, in the embodiment 1, a one component non-magnetic contact developing method was employed, but the present invention is not limited to such a method. A two component non-magnetic contact developing method, a non-contact developing method, a magnetic developing method, and the like method may also be employed. The two component non-magnetic contact developing method is a method in which a two component developer including non-magnetic toner and a magnetic carrier is used as the developer and in which the development is carried out by bringing the developer (magnetic brush) carried on the developer carrying member into contact with the photosensitive member. The non-contact developing method is a method in which the toner is jumped, onto the photosensitive member, from the developer carrying member provided opposed to the photosensitive member in a non-contact state. Further, the magnetic developing method is a method in which development is carried out by carrying the magnetic toner, by a magnetic force, on the developer carrying member which is provided opposed to the photosensitive member in a contact state or in a non-contact state and which contains a magnet as a magnetic field generating means.

A transfer roller 5 which is a rotatable roller-shaped transfer member as a transfer means is provided opposed to the photosensitive drum 1. The transfer roller 5 contacts the photosensitive drum 1 and forms a transfer portion (transfer position, transfer nip) Pd where the toner image is transferred from the photosensitive drum 1 onto a recording material S.

Herein, a contact portion between the transfer roller 5 and the photosensitive drum 1 with respect to the rotational direction of the photosensitive drum 1 is the transfer portion Pd. In the embodiment 1, the transfer roller 5 is an elastic roller in which an elastic layer constituted by a sponge rubber of an electroconductive NBR (nitrile-butadiene rubber)-hydrin type is formed around a core metal and which is 12 mm in outer diameter and 30° in hardness (Asker-C, load: 500 gf). The transfer roller 5 is pressed against the photosensitive drum 1 at a predetermined pressure. By being timed to the toner image on the photosensitive drum 1, a sheet-like recording material (sheet, transfer material, recording medium) S such as paper or a plastic film is fed by a feeding roller 8 as a feeding means from a cassette 6 or the like as a recording material accommodating portion to the transfer portion Pd. Then, the toner image formed on the photosensitive drum 1 is transferred in the transfer portion Pd onto the recording material S, fed so as to pass through the transfer portion Pd by being nipped between the photosensitive drum 1 and the transfer roller 5, by the action of the transfer roller 5. During the transfer, to the transfer roller 5, a predetermined transfer voltage (transfer bias) is applied by a transfer voltage source E3 (FIG. 3) as a transfer voltage applying means. In the embodiment 1, during the transfer, to the transfer roller 5, a DC voltage of a polarity (positive polarity in the embodiment 1) opposite to the normal polarity of the toner t is applied as the transfer voltage. In the embodiment 1, this transfer voltage (transfer HIGH described later) during the transfer is +1000 V as an example. Further, by the action of an electric field formed between the transfer roller 5 and the photosensitive drum 1, the toner image is electrostatically transferred from the photosensitive drum 1 onto the recording material S.

The recording material S on which the toner image is transferred is sent to a fixing device 9. The fixing device 9 applies heat and pressure to the recording material S on which the unfixed toner image is carried, so that the toner image is fixed (melted, sticked) on the recording material S. The recording material S on which the toner image is fixed is discharged (outputted) to an outside of the image forming apparatus 100.

On the other hand, toner (transfer residual toner) remaining on the photosensitive drum 1 without being transferred on the recording material S during the transfer is collected by the developing device 3 in a manner described later.

<Brush Member>

Next, a brush member 10 used for collecting the transfer residual toner in the embodiment 1 will be described.

As shown in FIG. 1, in the embodiment 1, the image forming apparatus 100 includes the brush member 10 forming a brush contact portion (brush contact position) Pe in contact with the surface of the photosensitive drum 1 on a side downstream of the transfer portion Pd and an upstream side of the charging portion Pa with respect to the rotational direction of the photosensitive drum 1. Herein, a contact portion between the brush member 10 and the photosensitive drum 1 with respect to the rotational direction of the photosensitive drum 1 is the brush contact portion (toner dispersing (scattering) portion) Pe.

Part (a) of FIG. 2 is a schematic view of the brush member 10 in a stand-alone state as viewed along a longitudinal direction (substantially parallel to a rotational axis direction of the photosensitive drum 1) thereof. Further, part (b) of FIG. 2 is a schematic view of the brush member 10 in a state of contact with the photosensitive drum 1 as viewed along the longitudinal direction thereof.

In the embodiment 1, the brush member 10 includes a brush portion constituted by an electroconductive fixed brush 11 disposed fixedly. The brush member 10 is disposed so that a longitudinal direction thereof is substantially parallel to the rotational axis direction of the photosensitive drum 1. In the embodiment 1, the fixed brush 11 is constituted by weaving electroconductive threads 11*a*, formed of nylon fibers in which an electroconductive substance is mixed, into a base cloth 11*b* formed of synthetic fibers in which carbon black is contained as an electroconductive agent. Incidentally, as a material of the electroconductive threads 11*a*, other than the nylon fibers, it may also be possible to use rayon fibers, acrylic fibers, polyester fibers, and the like fibers.

As shown in part (a) of FIG. 2, in the stand-alone state of the brush member 10, i.e., in a state in which a force for bending the electroconductive threads 11*a* is not externally applied, a distance from the base cloth 11*b* to tips of the electroconductive threads 11*a* extending from the base cloth 11*b* is referred to as L1. In the embodiment 1, L1 is 6.5 mm. The brush member 10 is disposed so that the base cloth 11*b* is fixed to a supporting member (not shown), provided at a predetermined position of the image forming apparatus 100, by a fixing means such as a double-side tape and so that the tips of the electroconductive threads 11*a* enter the photosensitive drum 1. In the embodiment 1, a clearance between the supporting member and the photosensitive drum 1 is fixed. Further, a minimum distance from the base cloth 11*b* of the brush member 10 fixed to the supporting member to the photosensitive drum 1 is referred to as L2. In the embodiment 1, a difference between L2 and L1 is defined as an entering amount of the brush member 10 into the photosensitive drum 1. In the embodiment 1, the entering amount of the brush member 10 into the photosensitive drum 1 is 1 mm. Further, in the embodiment 1, as shown in part (a) of FIG. 2, in the stand-alone state of the brush member 10, a length L3 of the brush member 10 with respect to a circumferential direction (hereinafter, referred to as a "short (side) direction") is 5 mm. Further, in the embodiment 1, a length of the brush member 10 with respect to the longitudinal direction is 216 mm. By this, with respect to the rotational axis direction, the brush member 10 is capable of being contacted to an entire area of an image forming region (region where the toner image is capable of being formed). Further, in the embodiment 1, a thickness of each of the electroconductive threads 11*a* is 2 denier, and a density of the electroconductive threads 11*a* is 280 kF/inch$^2$.

Incidentally, a length of the brush member 10 with respect to the short direction may preferably be 3 mm or more from the viewpoint of meeting lifetime extension. Further, the length of the brush member 10 with respect to the longitudinal direction can be appropriately changed depending on a maximum sheet passing width (maximum length of the image forming region with respect to the rotational axis direction of the photosensitive drum 1) of the image forming apparatus 100. Further, the thickness and the density of the electroconductive threads 11*a* may preferably be 1-6 denier and 150-350 kF/inch$^2$, respectively, from the viewpoint of a paper powder collecting property.

Further, to the brush member 10, a brush voltage source E4 (FIG. 3) as a brush voltage applying means is connected. During image formation, to the brush member 10, a predetermined brush voltage (brush bias) is applied by the brush voltage source E4. In the embodiment 1, during image formation, to the brush member 10, a DC voltage of the negative polarity is applied as the brush voltage. In the embodiment 1, the brush voltage (brush HIGH_1) is −300 V as an example.

<Collection of Transfer Residual Toner>

Next, collection of the transfer residual toner in the embodiment 1 will be described.

Most of the transfer residual toner is toner having an electric charge of the positive polarity, but toner having an electric charge of the negative polarity also exists. During the image formation, the surface of the photosensitive drum 1 is charged to the voltage of −700 V. The image region on the photosensitive drum 1 is exposed to light by the exposure device 4, so that the light portion potential Vl of −100 V is formed. Further, a non-image region on the photosensitive drum 1 is also passed through the transfer portion Pd, whereby a potential of about −100 V is formed by electric discharge between the photosensitive drum 1 and the transfer roller 5 to which the transfer voltage of +1000 V is applied. Accordingly, a surface potential of the photosensitive drum 1 reaching the brush contact portion Pe during the image formation becomes about −100 V. Of the transfer residual toner, the toner charged to the positive polarity is primary-collected at the brush contact portion Pe by the brush member 10 by being electrostatically attracted to the brush member 10 by a potential difference between the brush voltage (−300 V) and the surface potential (about −100 V)

of the photosensitive drum 1. On the other hand, of the transfer residual toner, the toner charged to the negative polarity passes through the brush contact portion Pe while being electrostatically attracted to the photosensitive drum 1 at the brush contact portion Pe by the potential difference between the brush voltage (−300 V) and the surface potential (about −100 V) of the photosensitive drum 1.

In the embodiment 1, the image forming apparatus 100 includes a pre-exposure device 7 as a processing means for processing the photosensitive drum 1 on a side downstream of the brush contact portion Pe and an upstream side of the charging portion Pa with respect to the rotational direction of the photosensitive drum 1. The pre-exposure device 7 optically discharges the surface potential of the photosensitive drum 1 before entering the charging portion Pa in order to generate stable (electric) discharge at the charging portion Pa. Incidentally, the (electric) discharge includes removal (attenuation) of at least a part of the electric charge. Herein, with respect to the rotational direction of the photosensitive drum 1, a position where the positive polarity surface is exposed to light (discharged) by the pre-exposure device 7 is a discharge portion Pf. The toner passed through the brush contact portion Pe passes through the discharge portion Pf and is stably charged to the negative polarity by uniform discharge at the charging portion Pa.

The toner of the negative polarity passed through the charging portion Pa is sent to the developing portion Pc with rotation of the photosensitive drum 1. The toner of the negative polarity sent to the developing portion Pc is moved to the developing roller 31 in a non-image region (non-exposure region) by a potential difference between the dark portion potential (Vd) of the surface of the photosensitive drum 1 and a developing bias (Vdc), and is collected into the developing device 3. On the other hand, in the image region (exposure region), the toner of the negative polarity sent to the developing portion Pc is not moved to the developing roller 31 by a potential difference between the light portion potential (Vl) and the developing bias (Vdc). This toner is sent as the image region toner as it is to the transfer portion Pd with rotation of the photosensitive drum 1, and is transferred onto the recording material S. Incidentally, the developing bias (Vdc) is sent at a potential between the dark portion potential (Vd) and the light portion potential (Vl).

<Image Output Operation>

The image forming apparatus 100 executes an image output operation (job) which is a series of operations for forming the image (images) on a single or a plurality of recording materials S by a single starting instruction from an external device (not shown) such as a personal computer in the embodiment 1. The job includes in general an image forming step (printing step), a pre-rotation step, a sheet interval step in the case where the images are formed on the plurality of recording materials S, and a post-rotation step. The image forming step is a period in which, formation of the electrostatic image on the photosensitive drum 1, development of the electrostatic image (formation of the toner image), transfer of the toner image, fixing of the toner image, and the like are carried out in actuality, and during image formation refers to this period. Specifically, a timing during image formation is different at each of the positions where the formation of the electrostatic image, the formation of the toner image, the transfer of the toner image, the fixing of the toner image, and the like are carried out. The pre-rotation step is a period in which a preparation operation, before the image forming step is performed. The sheet interval step is a period corresponding to an interval between two recording materials S when the image forming step on the plurality of recording materials S is continuously carried out (continuous image formation). The post-rotation step is a period in which a post operation (preparatory operation) after the image forming step is performed. During non-image formation is a period other than during image formation and includes the periods of the pre-rotation step, the sheet interval step, the post-rotation step, and in addition, during main switch actuation of the image forming apparatus 100, a pre-multi-rotation step which is a preparatory operation step during restoration from a sleep state, or the like. In the embodiment 1, at a predetermined timing during non-image formation, a cleaning operation, for the transfer roller 5 described later, performed for cleaning the transfer roller 5 by moving the toner or the like deposited on the transfer roller 5 from the transfer roller 5 onto the photosensitive drum 1 is executed.

FIG. 3 is a schematic block diagram showing a control mode of a principal part of the image forming apparatus 100 of the embodiment 1. The image forming apparatus 100 includes a controller 150. The controller 150 includes a CPU 151 as a calculation control means which is a central element for performing a calculation process, a memory (storing element) 152 such as a ROM or a RAM as a storing means, an input/output portion (not shown) for controlling transmission and reception of signals between the controller 150 and various elements connected to the controller 150. In the RAM, a detection result of a sensor, a calculation result, and the like are stored, and in the ROM, a control program, a data table acquired in advance, and the like are stored.

The controller 150 is a control means for integrally controlling an operation of the image forming apparatus 100. The controller 150 executes a predetermined image forming sequence by controlling the transmission and reception of various electrical information signals, a drive timing, and the like. To the controller 150, respective portions of the image forming apparatus 100 are connected. For example, in relation to the embodiment 1, to the controller 150, the charging voltage source E1, the developing voltage source E2, the transfer voltage source E3, and the brush voltage source E4 and the like are connected. The controller 150 executes the cleaning operation for the transfer roller 5 described later by controlling ON/OFF, output values, and the like of these various voltage sources E1, E2, E3, and E4.

<Cleaning Operation for Transfer Roller>

Next, the cleaning operation (cleaning mode) for the transfer roller 5 in the embodiment 1 will be described.

In the image forming apparatus 100, a "fog" such that the toner t is deposited on the photosensitive drum 1 in the non-image region (non-exposure region) occurs. Further, the toner t causing this fog is deposited on the transfer roller 5, for example, during the sheet interval step or during the pre-rotation step. During the sheet interval step or during the pre-rotation step, to the transfer roller 5, the transfer voltage of the positive polarity opposite to the normal polarity of the toner t, which is the same as the transfer voltage during the image formation is applied. For that reason, on the transfer roller 5, principally, of the toner t causing the fog, the toner t charged to the negative polarity which is the normal polarity is deposited and accumulated. On the other hand, of the toner t causing the fog, the toner t charged to the positive polarity which is the polarity opposite to the normal polarity is not deposited on the transfer roller 5 and remains on the photosensitive drum 1, and is primary-collected by the brush member 10 similarly as in the case of the transfer residual toner t.

FIG. 4 is a schematic view showing a state around the photosensitive drum 1 in the sheet interval step when a continuous image formation job for continuously forming a plurality of recording materials S is executed. As shown in FIG. 4, on the transfer roller 5, toner t of the negative polarity and an impurity D such as paper powder are deposited, and on the brush member 10, toner t of the positive polarity is deposited. When the toner tis deposited and accumulated on the transfer roller 5, the toner t causes back(-side) contamination of the recording material S or the like. For that reason, in the embodiment 1, the image forming apparatus 100 executes, in the post-rotation step as during the non-image formation, the cleaning operation for the transfer roller 5 in which the toner t deposited on the transfer roller 5 is moved from the transfer roller 5 to the photosensitive drum 1.

Here, as described above, on the transfer roller 5, the impurity D (foreign matter), other than the toner t, such as fibers of the paper powder or dust from paper principally used as the recording material S is also deposited. The toner t accumulated on the transfer roller 5 is mixed with the impurity D such as the paper powder, whereby during the cleaning operation for the transfer roller 5, a resultant mixture is moved from the transfer roller 5 to the photosensitive drum 1 in an agglomerated state or in a state in which the mixture is liable to agglomerate. Then, when the mixture of the toner t with the impurity D such as the paper powder passes through the brush member 10 without being dispersed (scattered) by the brush member 10, the mixture is physically scraped off of the photosensitive drum 1 by the charging roller 2, whereby the mixture is non-uniformly deposited on the charging roller 2 in some instances. By this, local improper charge of the photosensitive drum 1 is caused, so that an image defect such as density non-uniformity occurs in some instances.

Therefore, in the embodiment 1, during the cleaning operation for the transfer roller 5, the mixture of the negative polarity toner t with the impurity D such as the paper powder, which is moved from the transfer roller 5 to the photosensitive drum 1 is primary-collected into the brush member 10, and a period in which the negative polarity toner t and the impurity D such as the impurity D are separated from each other is provided. Further, thereafter, the negative polarity toner t is processed from the brush member 10 to the photosensitive drum 1 in a state in which the negative polarity toner t is separated from the impurity D such as the paper powder and is sufficiently scattered, and then is passed through the charging portion Pa, so that the negative polarity toner t is collected by the developing device 3. In the following, description will be made further specifically.

FIG. 5 is a timing chart of the cleaning operation for the transfer roller 5 executed in the post-rotation step in the embodiment 1. In the embodiment 1, this cleaning operation for the transfer roller 5 is executed by controlling operations of the respective portions of the image forming apparatus 100 in accordance with the timing chart of FIG. 5 by the controller 150. Incidentally, for convenience, the voltage applied to the transfer roller 5 by the transfer voltage source E3 during a time other than during the transfer is also referred to as the "transfer voltage".

Timing T1:

A timing T1 is a timing when the image forming step is ended and the post-rotation step is started.

At the timing T1, the transfer voltage is switched from transfer HIGH (+1000 V) during the image formation to transfer LOW (−1000 V). Here, in the embodiment 1, the transfer voltage is switched to the transfer LOW (−1000 V) at the timing T1, but the present invention is not limited to such a mode. A voltage value of the transfer voltage may only be required to be a voltage value at which an electric field such that the toner of the negative polarity is electrostatically attracted to the photosensitive drum 1. Specifically, this voltage value of the transfer voltage may only be required to be a voltage value which is higher than the surface potential (the dark portion potential Vd (−700 V) in the embodiment 1) of the photosensitive drum 1 on the negative polarity side and at which the (electric) discharge does not generate between the transfer roller 5 and the photosensitive drum 1. In the embodiment 1, this voltage value of the transfer voltage is a voltage value which is of the same polarity as the polarity of the surface potential (the dark portion potential Vd (−700 V) in the embodiment 1) of the photosensitive drum 1 and which is larger in absolute value than the surface potential of the photosensitive drum 1. Incidentally, in order to sufficiently attract the toner of the negative polarity to the photosensitive drum 1, a potential difference between this transfer voltage and the surface potential of the photosensitive drum 1 may preferably be 200 V or more. Further, in the embodiment 1, a discharge start voltage (discharge threshold) between the transfer roller 5 and the photosensitive drum 1 is about 600 V. At this timing, the surface potential of the photosensitive drum 1 at the transfer portion Pd is the dark portion potential Vd (−700 V). Accordingly, at a timing T2 and later, by a potential difference between the transfer LOW (−1000 V) and the surface potential (−700 V) of the photosensitive drum 1, the toner of the negative polarity accumulated on the transfer roller 5 is moved together with the impurity D such as the paper powder to the photosensitive drum 1.

On the other hand, the brush voltage is not changed from the brush voltage during the image formation and is brush HIGH_1 (−300 V). Further, at this timing, the surface potential of the photosensitive drum 1 at the brush contact portion Pe is the surface potential in a region where the transfer HIGH (+1000 V) during the image formation is applied at the transfer portion Pd and is about −100 V. Accordingly, the toner of the positive polarity primary-collected into the brush member 10 during the image formation remains in the brush member 10 without being discharged from the brush member 10 to the photosensitive drum 1.

FIG. 6 is a schematic view showing a state around the photosensitive drum 1 at the timing T1 and later. In FIG. 6, a region A of the photosensitive drum 1 shows a region in which the transfer voltage is applied to the photosensitive drum 1 at the transfer portion Pd at the time when the transfer voltage is switched from the transfer HIGH (+1000 V) to the transfer LOW (−1000 V) and later. That is, FIG. 6 shows the state around the photosensitive drum 1 before the region A in which the transfer LOW (−1000 V) is applied to the photosensitive drum 1 at the transfer portion Pd reaches the brush contact portion Pe. As shown in FIG. 6, the toner t of the negative polarity and the impurity D such as the paper powder which are accumulated on the transfer roller 5 are moved to the photosensitive drum 1. On the other hand, in the brush member 10, the toner t of the positive polarity stagnates.

Timing T2:

The timing T2 is a timing when the region A of the photosensitive drum 1 in which the transfer LOW (−1000 V) is applied to the photosensitive drum 1 at the transfer portion Pd reaches the brush contact portion Pe. At the timing T2, the brush voltage is switched from the brush HIGH_1 (−300 V) to brush HIGH_2 (−200 V). The surface potential of the photosensitive drum 1 at the brush contact portion Pe at this timing is the dark portion potential Vd (−700 V). Accordingly, both the toner t of the negative polarity and the impurity D such as the paper powder which are moved from the transfer roller 5 to the photosensitive drum 1 are primary-collected into the brush member 10. Further, the toner on the photosensitive drum stagnated in the brush member 10 is discharged from the brush member 10 to the photosensitive drum 1. Here, in the embodiment 1, at the timing T2, the brush voltage is switched to the brush HIGH_2 (−200 V), but the present invention is not limited to such a mode. A voltage value of this brush voltage may only be required to be a voltage value at which an electric field such that the toner t of the negative polarity is electrostatically attracted to the brush member 10 and that the toner t of the positive polarity is electrostatically attracted to the photosensitive drum 1. Specifically, this voltage value of the brush voltage may only be required to be a voltage value which is higher than the surface potential (the dark portion potential Vd (−700 V) in the embodiment 1) of the photosensitive drum 1 on the positive polarity side and at which the discharge does not generate between the brush member 10 and the photosensitive drum 1. Accordingly, when the above-described condition can be satisfied, the brush voltage does not have to be changed at the timing T2. In the embodiment 1, in consideration of a separating property between the toner t of the negative polarity and the impurity D such as the paper powder, a potential difference is made large by changing the brush voltage. In the embodiment 1, a voltage value of this brush voltage is a voltage value which is of the same polarity as the polarity of the surface potential (the dark portion potential Vd (−700 V) in the embodiment 1) of the photosensitive drum 1 and which is smaller in absolute value than the surface potential of the photosensitive drum 1. Incidentally, in order to sufficiently attract the toner t of the negative polarity to the brush member 10 and to sufficiently attract the toner t of the positive polarity to the photosensitive drum 1, a potential difference between this brush voltage and the surface potential of the photosensitive drum 1 may preferably be 200 V or more. Further, in the embodiment 1, a discharge start voltage (threshold voltage) between the brush member 10 and the photosensitive drum 1 is about 600 V.

Part (a) of FIG. 7 is a schematic view showing a state around the photosensitive drum 1 at the timing T2 and later.

The toner t of the positive polarity discharged from the brush member 10 to the photosensitive drum 1 is subjected to photo-discharge of the surface potential of the photosensitive drum 1 at the discharging portion Pf, and thereafter is charged to the negative polarity by uniform discharge at the charging portion Pa and is collected by the developing roller 31. On the other hand, the toner t of the negative polarity and the impurity D such as the paper powder which are primary-collected by the brush member 10 are rubbed with the photosensitive drum 1 while being electrostatically attracted to the brush member 10 by a potential difference between the brush HIGH_2 (−200 V) and the surface potential (−700 V) of the photosensitive drum 1.

Part (b) of FIG. 7 is a schematic view showing a state of an inside of the brush member 10 at this time. Inside the brush member 10, the toner t of the negative polarity and the impurity D such as the paper powder which are moved from the transfer roller 5 to the photosensitive drum 1, and the toner t of the positive polarity stagnated in the brush member 10 until then are present in mixture. Here, the impurity D which is the paper fibers, the dust, or the like tends to be physically intertwined and caught by the electroconductive threads 11*a* of the brush member 10 more than the toner t. Particularly, in the embodiment 1, the spherical toner is used as the toner t. The impurity D such as the paper fibers or the dust is not spherical in shape, and therefore, is easily intertwined and caught physically by the electroconductive thread 11*a*, so that the impurity D is liable to move in gaps of the electroconductive threads 11*a*. Further, by an electric field formed between the brush HIGH_2 (−200 V) and the surface potential (−700 V) of the photosensitive drum 1 and by friction (sliding) with rotation of the photosensitive drum 1, the toner t and the impurity D such as the paper powder are separated from each other in the brush member 10. At this time, the toner t with no sufficient electric charge is also capable of having a negative electric charge by the rubbing (friction) with the photosensitive drum 1. Further, also after the toner t of the positive polarity stagnated in the brush member 10 is discharged to the photosensitive drum 1, the toner t of the negative polarity is capable of maintaining a state in which the toner t of the negative polarity is not readily agglomerated and is easily movable in the brush member 10 by the above-described electric field and the above-described rubbing.

Thus, both the toner t and the impurity D such as the paper powder which are moved from the transfer roller 5 to the photosensitive drum 1 are primary-collected into the brush member 10, and by the electric field and the rubbing between the brush member 10 and the photosensitive drum 1, the toner t and the impurity D such as the paper powder can be separated from each other.

Timing T3:

A timing T3 is a timing when a predetermined time has elapsed from the timing T2 when the region A of the photosensitive drum 1 to which the transfer LOW (−1000 V) is applied at the transfer portion Pd reaches the brush contact portion Pa.

At the timing T3, the transfer voltage is switched from transfer LOW (−1000 V) to transfer HIGH (+1000 V). In the embodiment 1, the timing T2 can be set in the following manner. Further, it is desired that a time in which the toner t of the negative polarity accumulated on the transfer roller 5 during the image formation is sufficiently moved to the photosensitive drum 1 is ensured. Further, it is desired that a time in which the toner t of the positive polarity stagnated in the brush member 10 is sufficiently discharged to the photosensitive drum 1 is ensured. Further, it is desired that when the region of the photosensitive drum 1 to which the transfer HIGH (+1000 V) is applied at the transfer portion Pd reaches the brush contact portion Pe, the toner t of the negative polarity in the brush member 10 is sufficiently separated from the impurity D by the electric field and the rubbing at the brush contact portion Pe. In the embodiment 1, in consideration of a time in which the toner t of the positive polarity stagnated in the brush member 10 is discharged and a time in which the toner t of the negative polarity and the impurity D such as the paper powder in the brush member 10 are separated from each other, the timing T3 is set at a timing after a lapse of about 1.0 sec from the timing T2. The surface potential of the photosensitive drum 1 to which the transfer HIGH (+1000 V) is applied at the transfer portion Pd becomes about −100 V. Here, in the embodiment 1, the transfer voltage is switched to the transfer HIGH (+1000 V) which is the same as the transfer voltage during the image formation, at the timing T3, but the present invention is not limited to such a mode. A voltage value of the transfer voltage may only be required that the surface potential of the photosensitive drum 1 can be made higher than the brush voltage on the positive polarity side. Specifically, this voltage value of the transfer voltage may only be required to be a voltage value which is higher than the surface potential (the dark portion potential Vd (−700 V) in the embodiment 1) of the photosensitive drum 1 on the positive polarity side and at which the (electric) discharge generates between the transfer roller 5 and the photosensitive drum 1. For example, the voltage value may also be switched to a voltage value, such as the transfer HIGH_2 (+1500 V), different from the voltage value during the image formation. In the embodiment 1, this voltage value of the transfer voltage is a voltage value which is of the polarity opposite to the polarity of the surface potential (the dark portion potential Vd (−700 V) in the embodiment 1) of the photosensitive drum 1 and which is larger in absolute value than the surface potential of the photosensitive drum 1.

Part (a) of FIG. 8 is a schematic view showing a state around the photosensitive drum 1 at the timing T3 and later. In part (a) of FIG. 8, a region B of the photosensitive drum 1 shows a region in which the transfer voltage is applied to the photosensitive drum 1 at the transfer portion Pd at the time when the transfer voltage is switched from transfer LOW_2 (−1000 V) to the transfer HIGH (+1000 V) and later. That is, part (a) of FIG. 8 shows the state around the photosensitive drum 1 before the region B in which the transfer HIGH (+1000 V) is applied to the photosensitive drum 1 at the transfer portion Pd reaches the brush contact portion Pe. As shown in part (a) of FIG. 8, the toner t of the negative polarity and the impurity D such as the paper powder which are accumulated on the transfer roller 5 have completely moved to the photosensitive drum 1. Further, the toner t of the positive polarity stagnated in the brush member 10 is discharged to the photosensitive drum 1.

Part (b) of FIG. 8 is a schematic view showing a state of an inside of the brush member 10 at this time. Inside the brush member 10, the toner t of the negative polarity moved from the transfer roller 5 to the photosensitive drum 1 is primary-collected. At this time, the toner t of the negative polarity is maintained in a state in which the toner t of the negative polarity is not readily agglomerated and is easily movable in the brush member 10 by the above-described electric field and the above-described rubbing.

Timing T4:

A timing T4 is a timing when the region B of the photosensitive drum 1 in which the transfer HIGH (+1000 V) is applied to the photosensitive drum 1 at the transfer portion Pd reaches the brush contact portion Pe. At the timing T4, the brush voltage is switched from the brush HIGH_2 (−200 V) to brush HIGH_1 (−300 V). The surface potential of the photosensitive drum 1 at the brush contact portion Pe at this timing is about −100 V. Accordingly, the toner t of the negative polarity primary-collected in the brush member 10 is discharged from the brush member 10 to the photosensitive drum 1. On the other hand, the impurity D such as the paper powder physically intertwined and caught by the brush member 10 remains in the brush member 10. Here, in the embodiment 1, at the timing T4, the brush voltage is switched to the brush HIGH_1 (−300 V), but the present invention is not limited to such a mode. A voltage value of this brush voltage may only be required to be a voltage value at which an electric field such that the toner t of the negative polarity primary-collected in the brush member 10 is electrostatically attracted to the photosensitive drum 1. Specifically, this voltage value of the brush voltage may only be required to be a voltage value which is higher than the surface potential (about −100 V in the embodiment 1) of the photosensitive drum 1 on the negative polarity side (typically, the discharge does not generate between the brush member 10 and the photosensitive drum 1). In the embodiment 1, a voltage value of this brush voltage is a voltage value which is of the same polarity as the polarity of the surface potential (about −100 V in the embodiment 1) of the photosensitive drum 1 and which is larger in absolute value than the surface potential of the photosensitive drum 1. Incidentally, in order to sufficiently attract the toner t of the negative polarity to the brush member 10, a potential difference between this brush voltage and the surface potential of the photosensitive drum 1 may preferably be 200 V or more.

FIG. 9 is a schematic view showing a state around the photosensitive drum 1 at the timing T4 and later. As shown in FIG. 9, the toner t of the positive polarity discharged from the brush member 10 to the photosensitive drum 1 passes through the charging portion Pa in a state in which toner particles do not agglomerate together and are separated from the impurity D such as the paper powder, and is collected by the developing roller 31.

Timing T5:

A timing T5 is a timing after a lapse of a predetermined time from the timing T4 when the region B of the photosensitive drum 1 to which the transfer HIGH (+1000 V) is applied at the transfer portion Pd. The timing T5 is set so as to become a timing of collection of substantially all of the toner t of the negative polarity discharged from the brush member 10 to the photosensitive drum 1 and later. At the timing T5, the various voltage sources E1 to E4 and driving sources (not shown) such as a main motor (a driving motor for the photosensitive drum 1) and a scanner motor (a driving motor for a rotatable mirror of the exposure device 4) are turned off, and the post-rotation step is ended.

Incidentally, in the embodiment 1, the main motor, the transfer voltage source, the brush voltage source, and the like are turned off at the same timing, but the present invention is not limited thereto. For example, the timing may also be appropriately shifted depending on inertia of the motor, falling times of various voltages, and the like.

<Functional Effect>

As described above, in the embodiment 1, the image forming apparatus 100 includes a rotatable photosensitive member 1, a charging member 2 forming a charging portion Pa in contact with the photosensitive member 1 and configured to electrically charge a surface of the photosensitive member 1 at the charging portion Pa; an electrostatic image forming portion 4 configured to form an electrostatic image on the photosensitive member 1 charged by the charging member 2, a developing device 3 configured to form a toner image on the photosensitive member 1 by supplying toner, charged to a normal polarity, to the electrostatic image, a transfer member 5 forming a transfer portion Pd in contact with the photosensitive member 1 and configured to transfer the toner image from the photosensitive member 1 onto a recording material S passing through the transfer portion Pd; a transfer voltage source E3 configured to apply a voltage to the transfer member 5, a brush member 10 forming a contact portion Pe in contact with the photosensitive member 1 on a side downstream of the transfer portion Pd and an upstream side of the charging portion Pa with respect to a rotational direction of the photosensitive member 1, a brush voltage source E4 configured to apply a voltage to the brush member 10, and a controller 150 capable of executing a cleaning operation for moving the toner, deposited on the transfer member 5, from the transfer member 5 onto the surface of the photosensitive member 1 when the recording material S is absent at the transfer portion Pd. Further, in the embodiment 1, the controller 150 carries out control so that the cleaning operation includes a first operation (cleaning operation) (T1 to T3) in which a potential difference is formed between the transfer member 5 and the photosensitive member 1 so that the toner charged to the normal charge polarity is moved from the transfer member 5 toward the photosensitive member 1, and a second operation (collecting operation) (T2 to T4) in which a potential difference is formed between the brush member 10 and the photosensitive member 1 so that the toner charged to the normal charge polarity is moved from the photosensitive member 1 toward the brush member 10. In the embodiment 1, the controller 150 controls the voltage applied to the transfer member 5 by the transfer voltage source E3 in the cleaning operation. Further, in the embodiment 1, the controller 150 controls the voltage applied to the brush member 10 by the brush voltage source E4 in the cleaning operation.

Particularly, in the embodiment 1, in the first operation, the controller 150 carries out control so that a voltage (transfer LOW) which is higher toward a normal polarity side of the toner than a potential of the surface of the photosensitive member 1 charged by the charging member 2 and reaching the transfer portion Pd and at which electric discharge does not occur between the transfer member 5 and the photosensitive member 1 is applied to the transfer member 5 by the transfer voltage source E3. Further, in the embodiment 1, in the second operation, the controller 150 carries out control so that a voltage (brush HIGH_2) which is higher toward a side opposite to a normal polarity side of the toner than a potential of the surface of the photosensitive member 1 passed through the transfer portion Pd and reaching the contact portion Pe and at which electric discharge does not occur between the brush member 10 and the photosensitive member 1 is applied to the brush member 10 by the brush voltage source E4. Further, in the embodiment 1, the controller 150 carries out control so that the second operation continues over a predetermined time from at least a time when a leading end of the surface of the photosensitive member 1, with respect to the rotational direction, passing through the transfer portion Pd in the first operation reaches the brush contact portion Pe. Here, a time in which the toner of the normal polarity and the impurity D such as the paper powder which are inside the brush member 10 are separated from each other may preferably be 500 ms or more, so that the predetermined time may preferably be 500 ms or more, and is typically about 1.0 s. Incidentally, the predetermined time is sufficient in many instances when the predetermined time is 3.0 s or less, and is typically 1.5 s or less. In other words, the predetermined time can be made approximately a time taken for rotation of the photosensitive member 1 through one to three full circumferences, typically two full circumferences. Further, in the embodiment 1, after the second operation is ended and later, the controller 150 carries out control so that the cleaning operation includes a third operation (discharging operation) (T4 to T5) in which a potential difference is formed between the brush member 10 and the photosensitive member 1 so that the toner charged to the normal polarity is moved from the brush member 10 toward the photosensitive member 1. In the embodiment 1, in the third operation, the controller 150 carries out control so that a voltage (brush HIGH_1) higher toward a normal polarity side of the toner than a potential of the surface of the photosensitive member 1 passing through the transfer portion Pd and reaching the brush contact portion Pe after the first operation is ended is applied to the brush member 10 by the brush voltage source E4. This voltage (brush HIGH_1) is typically a voltage at which the discharge does not generate between the brush member 10 and the photosensitive drum 1. Further, in the embodiment 1, after the first operation is ended and later, the controller 150 carries out control so that a voltage (transfer HIGH) which is higher toward a side opposite to the normal polarity side of the toner than the potential of the surface of the photosensitive member 1 charged by the charging member 2 and reaching the transfer portion Pd and at which electric discharge occurs between the transfer member 5 and the photosensitive member 1 is applied to the transfer member 5 by the transfer voltage source E3.

Further, in the embodiment 1, the brush member 10 includes an electroconductive brush portion fixedly provided. Further, in the embodiment 1, when the toner remaining on the surface of the photosensitive member 1 after the toner image is transferred at the transfer portion Pd from the photosensitive member 1 onto the recording material S passes through the brush contact portion Pe, a voltage (brush HIGH_1) of the same polarity as the normal polarity is applied to the brush member 10 by the brush voltage source E4. This voltage (brush HIGH_1) is typically a voltage at which the discharge does not generate between the brush member 10 and the photosensitive member 1. Further, in the embodiment 1, the toner remaining on the surface of the photosensitive member 1 after the toner image is transferred at the transfer portion Pd from the photosensitive member 1 onto the recording material S is collected by the developing device 3. Further, in the embodiment 1, the toner has average circularity of 0.96 or more.

Thus, in the embodiment 1, during the cleaning operation for the transfer roller 5, the toner of the negative polarity moved from the transfer roller 5 to the photosensitive drum 1 is primary-collected into the brush member 10. Then, this toner of the negative polarity is discharged from the brush member 10 to the photosensitive drum 1 in a state in which the toner of the negative polarity is separated from the impurity D such as the paper powder by the electric field and the rubbing between the brush member 10 and the photosensitive drum 1 in the brush contact portion Pe. By this, non-uniform deposition of the toner on the charging roller 2 by mutual agglomeration between the toner particles is suppressed, so that it is possible to suppress an occurrence of an image defect such as density non-uniformity due to local improper charge.

Next, another embodiment of the present invention will be described. Basic constitution and operation of an image forming apparatus of an embodiment 2 are similar to those of the image forming apparatus of the embodiment 1. Accordingly, in the image forming apparatus of the embodiment 2, elements having identical or corresponding functions of constitutions to those of the image forming apparatus of the embodiment 1 are represented by adding the same reference numerals or symbols as those in the embodiment 1 and will be omitted from detailed description.

FIG. 10 is a schematic sectional view of an image forming apparatus 100 of the embodiment 2. Further, FIG. 11 is a schematic sectional view showing a state of a brush member 10 alone in the embodiment 2. In the embodiment 2, the brush member 10 includes a brush portion constituted by an electroconductive brush roller 12 which is a rotatable member. In the embodiment 2, the brush roller 12 is constituted by winding, about a core metal **12*c*, a base cloth 12*b* into which electroconductive threads 12*a* are woven. The base cloth 12*b* is bonded to the core metal 12*c* by an electroconductive adhesive as a fixing means. Further, the core metal 12*c* is supported by electroconductive bearings (not shown), and through the electroconductive bearings, a brush voltage is applied to the brush roller 12 from the brush voltage source E4. The base cloth 12*b* is formed of synthetic fibers containing carbon black as the electroconductive agent, and the electroconductive threads 12***a* are formed of nylon fibers in which an electroconductive substance is mixed.

As shown in FIG. 11, a distance to a free end of the electroconductive thread 12*a* exposed from the base cloth 12*a* in a state of the brush roller 12 alone is referred to as L4. In the embodiment 2, L4 is 3 mm. Further, similarly as the electroconductive threads 11*a* of the fixed brush 11 in the embodiment 1, the thickness of each of the electroconductive threads 12*a* of the brush roller 12 is 2 denier, and the density of the electroconductive threads 12*a* is 280 kF/inch$^2$. Further, a length (outer diameter) of the brush roller 12 in the embodiment 2 with respect to a circumferential direction ("short (side) direction") of the photosensitive drum 1 is about 11 mm, and a diameter of the core metal 12*c* is 5 mm. Incidentally, as a material of the electroconductive threads 12*a*, other than the nylon fibers, it may also be possible to use rayon fibers, acrylic fibers, polyester fibers, and the like fibers. In the embodiment 2, a clearance between the core metal 12*c* and the photosensitive drum 1 is fixed. Further, a difference between the above-described L4 and a minimum distance from the base cloth 12*b*, fixed to the core metal 12*c*, to the photosensitive drum 1 is defined as an entering amount. In the embodiment 2, the entering amount of the electroconductive threads 12*a* into the photosensitive drum 1 is 1 mm. Further, in the embodiment 2, the brush roller 12 is rotated with the rotation of the photosensitive drum 1.

A cleaning operation for the transfer roller 5 in the embodiment 2 is similar to the cleaning operation in the embodiment 1, and is executed in accordance with the timing chart of FIG. 5.

In the embodiment 2, similarly as in the embodiment 1, during the cleaning operation for the transfer roller 5, the toner of the negative polarity moved from the transfer roller 5 to the photosensitive drum 1 is primary-collected into the brush roller 12 constituting the brush member 10. Then, this toner of the negative polarity is discharged from the brush roller 12 to the photosensitive drum 1 in a state in which the toner of the negative polarity is separated from the impurity D such as the paper powder by the electric field and the rubbing between the brush roller 12 and the photosensitive drum 1 in the brush contact portion Pe. By this, non-uniform deposition of the toner on the charging roller 2 by mutual agglomeration between the toner particles is suppressed, so that it is possible to suppress an occurrence of an image defect such as density non-uniformity due to local improper charge.

Further, in the embodiment 2, the brush member 10 is constituted by a rotatable brush roller 12, and therefore, a contact position between the electroconductive threads 12*a* and the photosensitive drum 1 changes. For that reason, the transfer residual toner is liable to be scattered when it passes through the brush contact portion Pe. On the other hand, the toner moved from the transfer roller 5 to the photosensitive drum 1 can be primary-collected into the brush roller 12 by forming a potential difference between the brush voltage and the surface potential of the photosensitive drum 1.

Incidentally, in the embodiment 2, the brush member 10 is rotated with the rotation of the photosensitive drum 1, but the present invention is not limited to such a mode. For example, in order to enhance a scraping-off property for the impurity D such as the paper powder on the photosensitive drum 1, the brush member 10 may also be rotationally driven and thus a peripheral speed difference between itself and the photosensitive drum 1 may be provided, and may also be rotationally driven in a direction counter to the photosensitive drum 1. Further, the brush member 10 may also be rotationally driven without providing a peripheral speed difference.

That is, the brush member 10 may include the rotatable electroconductive brush portion roller 12. Further, the brush roller 12 can employ a constitution in which the brush roller 12 is rotated with the rotation of the photosensitive drum 1 or so that the photosensitive drum 1 and the brush roller 12 are rotationally driven so as to move in the same (normal) direction or opposite directions at the brush contact portion Pe without a speed difference therebetween with respect to the peripheral speed difference.

Next, another embodiment of the present invention will be described. Basic constitution and operation of an image forming apparatus of an embodiment 3 are similar to those of the image forming apparatus 100 of Embodiment 1. Accordingly, in the image forming apparatus of the embodiment 2, elements having identical or corresponding functions of constitutions to those of the image forming apparatus of the embodiment 1 are represented by adding the same reference numerals or symbols as those in the embodiment 1 and will be omitted from detailed description.

In the embodiment 3, a period in which during the cleaning operation for the transfer roller 5, the toner of the positive polarity stagnating in the brush member 10 is discharged from the brush member 10 to the photosensitive drum 1 before the toner of the negative polarity moved from the transfer roller 5 to the photosensitive drum 1 reaches the brush contact portion Pe is provided. In the following, description will be made further specifically.

<Cleaning Operation for Transfer Roller>

FIG. 12 is a timing chart of the cleaning operation for the transfer roller 5 executed in the post-rotation step in the embodiment 3. In the embodiment 3, this cleaning operation for the transfer roller 5 is executed by controlling operations of the respective portions of the image forming apparatus 100 in accordance with the timing chart of FIG. 12 by the controller 150. Incidentally, for convenience, the voltage applied to the transfer roller 5 by the transfer voltage source E3 during a time other than during the transfer is also referred to as the "transfer voltage".

Timing T1:

A timing T1 is a timing when the image forming step is ended and the post-rotation step is started.

At the timing T1, the transfer voltage is switched from transfer HIGH (+1000 V) during the image formation to transfer LOW_1 (−200 V). Here, in the embodiment 3, the transfer voltage is switched to the transfer LOW_1 (−200 V) at the timing T1, but the present invention is not limited to such a mode. A voltage value of the transfer voltage may only be required to be a voltage value at which an electric field such that the toner of the negative polarity is electrostatically attracted to the transfer roller 5. Specifically, this voltage value of the transfer voltage may only be required to be a voltage value which is higher than the surface potential (the dark portion potential Vd (−700 V) in the embodiment 3) of the photosensitive drum 1 on the positive polarity side and at which the (electric) discharge does not generate between the transfer roller 5 and the photosensitive drum 1. In the embodiment 3, this voltage value of the transfer voltage is a voltage value which is of the same polarity as the polarity of the surface potential (the dark portion potential Vd (−700 V) in the embodiment 3) of the photosensitive drum 1 and which is smaller in absolute value than the surface potential of the photosensitive drum 1. Incidentally, in order to sufficiently attract the toner of the negative polarity to the transfer roller 5, a potential difference between this transfer voltage and the surface potential of the photosensitive drum 1 may preferably be 200 V or more. Further, in the embodiment 3, a discharge start voltage (discharge threshold) between the transfer roller 5 and the photosensitive drum 1 is about 600 V. At this timing, the surface potential of the photosensitive drum 1 at the transfer portion Pd is the dark portion potential Vd (−700 V). Accordingly, by a potential difference between the transfer LOW_1 (−200 V) and the surface potential (−700 V) of the photosensitive drum 1, the toner of the negative polarity accumulated on the transfer roller 5 maintains a state in which the toner of the negative polarity is electrostatically attracted, together with the impurity D such as the paper powder, to the transfer roller 5.

On the other hand, the brush voltage is not changed from the brush voltage during the image formation and is brush HIGH_1 (−300 V). Further, at this timing, the surface potential of the photosensitive drum 1 at the brush contact portion Pe is the surface potential in a region where the transfer HIGH (+1000 V) during the image formation is applied at the transfer portion Pd and is about −100 V. Accordingly, the toner of the positive polarity primary-collected into the brush member 10 during the image formation remains in the brush member 10 without being discharged from the brush member 10 to the photosensitive drum 1.

Timing 2:

A timing T2 is a timing when a region (region of the dark portion potential Vd (−700 V)) of the photosensitive drum 1 to which the transfer LOW_1 (−200) is applied at the transfer portion Pd reaches the brush contact portion Pe. At this timing, the brush voltage is not changed from the brush voltage during the image formation, and is the brush HIGH_1 (−300 V). Accordingly, at the timing T2 and later, by a potential difference between the brush HIGH_1 (−300 V) and the surface potential (−700 V) of the photosensitive drum 1, the toner of the positive polarity stagnated in the brush member 10 is discharged to the photosensitive drum 1. Here, in the embodiment 3, the transfer voltage is maintained at the transfer HIGH_1 (−300 V) at the timing T2, but the present invention is not limited to such a mode. A voltage value of the brush voltage may only be required to be a voltage value at which an electric field such that the toner of the positive polarity is electrostatically attracted to the photosensitive drum 1. Specifically, this voltage value of the brush voltage may only be required to be a voltage value which is higher than the surface potential (the dark portion potential Vd (−700 V) in the embodiment 3) of the photosensitive drum 1 on the positive polarity side and at which the (electric) discharge does not generate between the brush member 10 and the photosensitive drum 1. Accordingly, if the above condition can be satisfied, the brush voltage may also be changed at the timing T2. In the embodiment 3, this voltage value of the brush voltage is a voltage value which is of the same polarity as the polarity of the surface potential (the dark portion potential Vd (−700 V) in the embodiment 3) of the photosensitive drum 1 and which is smaller in absolute value than the surface potential of the photosensitive drum 1. Incidentally, in order to sufficiently attract the toner of the positive polarity to the photosensitive drum 1, a potential difference between this brush voltage and the surface potential of the photosensitive drum 1 may preferably be 200 V or more. Further, in the embodiment 3, a discharge start voltage (discharge threshold) between the brush member 10 and the photosensitive drum 1 is about 600 V.

FIG. 13 is a schematic view showing a state around the photosensitive drum 1 when the toner t of the positive polarity is discharged from the brush member 10 to the photosensitive drum 1 at the timing T2 and later. As shown in FIG. 13, the toner t of the positive polarity stagnated in the brush member 10 is discharged to the photosensitive drum 1.

The toner t of the positive polarity discharged from the brush member 10 is subjected to photo-discharge of the surface potential of the photosensitive drum 1 at the discharge portion Pf, and thereafter is charged to the negative polarity by uniform discharge at the charging portion Pa, so that the negatively charged toner t is collected by the developing roller 31. On the other hand, on the transfer roller 5, the toner of the negative polarity and the impurity D such as the paper powder are maintained in an accumulated state.

Timing T3:

A timing T3 is a timing after a lapse of a predetermined time from the timing T2 when a region (region of the dark portion potential Vd (−700 V)) of the photosensitive drum 1 to which the transfer LOW_1 (−200 V) is applied at the transfer portion Pd reaches the brush contact portion Pe. At the timing T3, the transfer voltage is switched from the transfer LOW_1 (−200 V) to the transfer LOW_2 (−1000 V). The timing T3 can be set in the following manner. That is, it is desired that a time in which the toner t of the positive polarity stagnated in the brush member 10 is sufficiently discharged to the photosensitive drum 1 is ensured. In the embodiment 3, the timing T3 is after a lapse of rotation of the photosensitive drum 1 through half (about 300 ms) of one full circumference from the timing T2. Here, in the embodiment 3, the transfer voltage is switched to the transfer LOW_2 (−1000 V) at the timing T3, but the present invention is not limited to such a mode. A voltage value of the transfer voltage may only be required to be a voltage value at which an electric field such that the toner t of the negative polarity is electrostatically attracted to the photosensitive drum 1. Specifically, this voltage value of the transfer voltage may only be required to be a voltage value which is higher than the surface potential (the dark portion potential Vd (−700 V) in the embodiment 3) of the photosensitive drum 1 on the negative polarity side and at which the (electric) discharge does not generate between the transfer roller 5 and the photosensitive drum 1. In the embodiment 3, this voltage value of the transfer voltage is a voltage value which is of the same polarity as the polarity of the surface potential (the dark portion potential Vd (−700 V) in the embodiment 3) of the photosensitive drum 1 and which is larger in absolute value than the surface potential of the photosensitive drum 1. Incidentally, in order to sufficiently attract the toner t of the negative polarity to the photosensitive drum 1, a potential difference between this transfer voltage and the surface potential of the photosensitive drum 1 may preferably be 200 V or more. At this timing, the surface potential of the photosensitive drum 1 at the transfer portion Pd is the dark portion potential Vd (−700 V). Accordingly, at the timing T3 and later, at the timing T3 and later, by a potential difference between the transfer LOW_1 (−1000 V) and the surface potential (−700 V) of the photosensitive drum 1, the toner t of the negative polarity accumulated on the transfer roller 5 is moved together with the impurity D such as the paper powder, to the photosensitive drum 1.

FIG. 14 is a schematic view showing a state around the photosensitive drum 1 when at the timing T3 and later, the toner t of the negative polarity and the impurity D such as the paper powder are moved from the transfer roller 5. As shown in FIG. 6, the toner t of the negative polarity and the impurity D such as the paper powder which are accumulated on the transfer roller 5 are moved to the photosensitive drum 1. Further, the toner t of the positive polarity stagnated in the brush member 10 is completely discharged to the photosensitive drum 1.

Timing T4:

A timing T4 is a timing when the region of the photosensitive drum 1 in which the transfer LOW_2 (−1000 V) is applied to the photosensitive drum 1 at the transfer portion Pd reaches the brush contact portion Pe. At the timing T4, the brush voltage is switched from the brush HIGH_1 (−300 V) to brush HIGH_2 (−200 V). The surface potential of the photosensitive drum 1 at the brush contact portion Pe at this timing is the dark portion potential Vd (−700 V). Accordingly, both the toner t of the negative polarity and the impurity D such as the paper powder which are moved from the transfer roller 5 to the photosensitive drum 1 are primary-collected into the brush member 10.

In the embodiment 3, at this timing, there is substantially no toner t of the positive polarity in the brush member 10, and therefore, the toner t of the negative polarity and the toner t of the positive polarity are not present in a mixture in the brush member 10. By this, it is possible to suppress a scramble for the electric charge by and agglomeration between the toner t of the positive polarity and the toner t of the negative polarity and to suppress stagnation of the toner t in the brush member therewith. Here, in the embodiment 3, at the timing T4, the brush voltage is switched to the brush HIGH_2 (−200 V), but the present invention is not limited to such a mode. A voltage value of this brush voltage may only be required to be a voltage value at which an electric field such that the toner t of the negative polarity is electrostatically attracted to the brush member 10. Specifically, this voltage value of the brush voltage may only be required to be a voltage value which is higher than the surface potential (the dark portion potential Vd (−700 V) in the embodiment 3) of the photosensitive drum 1 on the positive polarity side and at which the discharge does not generate between the brush member 10 and the photosensitive drum 1. Accordingly, when the above-described condition can be satisfied, the brush voltage does not have to be changed at the timing T4. In the embodiment 3, in consideration of a separating property between the toner t of the negative polarity and the impurity D such as the paper powder, a potential difference is made large by changing the brush voltage. In the embodiment 3, a voltage value of this brush voltage is a voltage value which is of the same polarity as the polarity of the surface potential (the dark portion potential Vd (−700 V) in the embodiment 3) of the photosensitive drum 1 and which is smaller in absolute value than the surface potential of the photosensitive drum 1. Incidentally, in order to sufficiently attract the toner t of the negative polarity to the brush member 10, a potential difference between this brush voltage and the surface potential of the photosensitive drum 1 may preferably be 200 V or more.

Part (a) of FIG. 15 is a schematic view showing a state around the photosensitive drum 1 at the timing T4 and later. The toner t of the negative polarity and the impurity D such as the paper powder which are primary-collected by the brush member 10 are rubbed with the photosensitive drum 1 while being electrostatically attracted to the brush member 10 by a potential difference between the brush HIGH_2 (−200 V) and the surface potential (−700 V) of the photosensitive drum 1.

Part (b) of FIG. 15 is a schematic view showing a state of an inside of the brush member 10 at this time. Inside the brush member 10, only the toner t of the negative polarity and the impurity D such as the paper powder which are moved from the transfer roller 5 to the photosensitive drum 1 are substantially present, and the toner t of the positive polarity stagnated in the brush member 10 is not present. Further, by the electric field and the friction (sliding) at the brush contact portion Pe, the toner t and the impurity D such as the paper powder are separated from each other in the brush member 10. At this time, the toner t with no sufficient electric charge is also capable of having a negative electric charge by the rubbing (friction) with the photosensitive drum 1. Further, the toner t of the negative polarity is capable of maintaining a state in which the toner t of the negative polarity is not readily agglomerated and is easily movable in the brush member 10 by the above-described electric field and the above-described rubbing.

Timing T5:

A timing T5 is a timing when a predetermined time has elapsed from the timing T4 when the region of the photosensitive drum 1 to which the transfer LOW_2 (−1000 V) is applied at the transfer portion Pd reaches the brush contact portion Pa.

At the timing T5, the transfer voltage is switched from transfer LOW_(−1000 V) to transfer HIGH (+1000 V). In the embodiment 3, at a point of a time of the timing T3, the toner t of the positive polarity stagnated in the brush member 10 is discharged to the photosensitive drum 1. For that reason, in the embodiment 2, the timing T5 can be set in the following manner. Further, it is desired that a time in which the toner t of the negative polarity accumulated on the transfer roller 5 is sufficiently moved to the photosensitive drum 1 is ensured. Further, it is desired that when the region of the photosensitive drum 1 to which the transfer HIGH (+1000 V) is applied at the transfer portion Pd reaches the brush contact portion Pe, the toner t of the negative polarity in the brush member 10 is sufficiently separated from the impurity D by the electric field and the rubbing at the brush contact portion Pe. In the embodiment 3, in consideration of time in which the toner t of the negative polarity and the impurity D such as the paper powder in the brush member 10 are separated from each other, the timing T5 is set at a timing after a lapse of about 700 ms from the timing T3. Incidentally, the time in which the toner t of the negative polarity and the impurity D such as the paper powder in the brush member 10 is separated from each other may preferably be 500 ms. In the embodiment 3, in consideration of a transfer voltage switching time or the like, the timing T5 was after a lapse of about 700 ms from the timing T3. The surface potential of the photosensitive drum 1 to which the transfer HIGH (+1000 V) is applied at the transfer portion Pd becomes about −100 V. Here, in the embodiment 3, the transfer voltage is switched to the transfer HIGH (+1000 V) which is the same as the transfer voltage during the image formation, at the timing T5, but the present invention is not limited to such a mode. A voltage value of the transfer voltage may only be required that the surface potential of the photosensitive drum 1 can be made higher than the brush voltage on the positive polarity side. Specifically, this voltage value of the transfer voltage may only be required to be a voltage value which is higher than the surface potential (the dark portion potential Vd (−700 V) in the embodiment 1) of the photosensitive drum 1 on the positive polarity side and at which the (electric) discharge generates between the transfer roller 5 and the photosensitive drum 1. For example, the voltage value may also be switched to a voltage value, such as the transfer HIGH 2 (+1500 V), different from the voltage value during the image formation. In the embodiment 1, this voltage value of the transfer voltage is a voltage value which is of the polarity opposite to the polarity of the surface potential (the dark portion potential Vd (−700 V) in the embodiment 1) of the photosensitive drum 1 and which is larger in absolute value than the surface potential of the photosensitive drum 1.

Incidentally, at the timing T5 and later, a state about the photosensitive drum 1 and a state of an inside of the brush member 10 are similar to the states shown in parts (a) and (b) of FIG. 8 described in the embodiment 3. However, in the embodiment 3, the toner t (particularly the toner of the positive polarity substantially does not exist between the brush contact portion Pe and the developing portion Pc in part (a) of FIG. 9. Also, in the embodiment 3, the toner t of the negative polarity in the brush member 10 is maintained in the state in which the toner t of the negative polarity is not readily agglomerated and is easily movable in the brush member 10 by the above-described electric field and the above-described rubbing.

Timing T6:

A timing T6 is a timing when the region of the photosensitive drum 1 in which the transfer HIGH (+1000 V) is applied to the photosensitive drum 1 at the transfer portion Pd reaches the brush contact portion Pe. At the timing T6, the brush voltage is switched from the brush HIGH_2 (−200 V) to brush HIGH_1 (−300 V). The surface potential of the photosensitive drum 1 at the brush contact portion Pe at this timing is about −100 V. Accordingly, the toner t of the negative polarity primary-collected in the brush member 10 is discharged from the brush member 10 to the photosensitive drum 1. On the other hand, the impurity D such as the paper powder physically intertwined and caught by the brush member 10 remains in the brush member 10. Here, in the embodiment 3, at the timing T6, the brush voltage is switched to the brush HIGH_1 (−300 V), but the present invention is not limited to such a mode. A voltage value of this brush voltage may only be required to be a voltage value at which an electric field such that the toner t of the negative polarity primary-collected in the brush member 10 is electrostatically attracted to the photosensitive drum 1. Specifically, this voltage value of the brush voltage may only be required to be a voltage value which is higher than the surface potential (about −100 V in the embodiment 1) of the photosensitive drum 1 on the negative polarity side (typically, the discharge does not generate between the brush member 10 and the photosensitive drum 1). In the embodiment 3, a voltage value of this brush voltage is a voltage value which is of the same polarity as the polarity of the surface potential (about −100 V in the embodiment 3) of the photosensitive drum 1 and which is larger in absolute value than the surface potential of the photosensitive drum 1. Incidentally, in order to sufficiently attract the toner t of the negative polarity to the brush member 10, a potential difference between this brush voltage and the surface potential of the photosensitive drum 1 may preferably be 200 V or more.

Incidentally, at the timing T6 and later, the state around the photosensitive drum 1 and the state of the brush member 10 are similar to the states shown in parts (a) and (b) of FIG. 9. Also, in the embodiment 3, the toner t of the positive polarity discharged from the brush member 10 to the photosensitive drum 1 passes through the charging portion Pa in a state in which toner particles do not agglomerate together and are separated from the impurity D such as the paper powder, and is collected by the developing roller 31.

Timing T7:

A timing T7 is a timing after a lapse of a predetermined time from the timing T4 when the region of the photosensitive drum 1 to which the transfer HIGH (+1000 V) is applied at the transfer portion Pd. The timing T7 is set so as to become a timing of collection of substantially all of the toner t of the negative polarity discharged from the brush member 10 to the photosensitive drum 1 and later. At the timing T7, the various voltage sources E1 to E4 and driving sources (not shown) such as a main motor (a driving motor for the photosensitive drum 1) and a scanner motor (a driving motor for a rotatable mirror of the exposure device 4) are turned off, and the post-rotation step is ended.

Incidentally, in the embodiment 3, the main motor, the transfer voltage source, the brush voltage source, and the like are turned off at the same timing, but the present invention is not limited thereto. For example, the timing may also be appropriately shifted depending on inertia of the motor, falling times of various voltages, and the like.

<Functional Effect>

As described above, in the embodiment 3, the controller 150 carries out control so that the cleaning operation includes a fourth operation (pre-collection discharging operation) (T2 to T4) in which a potential difference such that the toner charged to the polarity opposite to the normal polarity is moved from the brush member 10 toward the photosensitive member 1 is formed between the brush member 10 and the photosensitive member 1 before an end of the surface of the photosensitive member 1 with respect to the rotational direction passing through the transfer portion Pd in the cleaning operation reaches the brush contact portion Pe. In the embodiment 3, the controller 150 carries out control so that in the fourth operation, the voltage (brush HIGH_1) which is higher, on the opposite polarity side to the normal polarity of the toner, than the surface potential of the photosensitive member 1 passing through the transfer portion Pd and reaching the brush contact portion Pe in a state that the discharge does not generate between the transfer member 5 and the photosensitive member 1 after the photosensitive member 1 is charged by the charging member 2 and at which the discharge does not generate between the brush member 10 and the photosensitive member 1 is applied to the brush member 10 by the brush voltage source E4.

Thus, in the embodiment 3, similarly as in the embodiment 1, during the cleaning operation for the transfer roller 5, the toner of the negative polarity moved from the transfer roller 5 to the photosensitive drum 1 is primary-collected into the brush member 10. Then, this toner of the negative polarity is discharged from the brush member 10 to the photosensitive drum 1 in a state in which the toner of the negative polarity is separated from the impurity D such as the paper powder by the electric field and the rubbing between the brush member 10 and the photosensitive drum 1 in the brush contact portion Pe. By this, non-uniform deposition of the toner on the charging roller 2 by mutual agglomeration between the toner particles is suppressed, so that it is possible to suppress an occurrence of an image defect such as density non-uniformity due to local improper charge.

Further, in the embodiment 3, the toner of the positive polarity stagnated in the brush member 10 is discharged to the photosensitive drum 1 before the toner of the negative polarity moved from the transfer roller 5 to the photosensitive drum 1 reaches the brush contact portion Pe. By this, it is possible to suppress the electric charge from agglomeration between the toner of the positive polarity and the toner of the negative polarity and to suppress the toner stagnation in the brush member 10 therewith.

Incidentally, similarly as in the embodiment 2, in the embodiment 3, the brush member 10 constituted by the brush roller 12 may also be used.

As described above, the present invention was described in accordance with specific embodiments, but the present invention is not limited to the above-described embodiments.

In the above-described embodiments, the surface potential of the photosensitive drum is controlled by changing the transfer voltage or the brush voltage, but the present invention is not limited to such an embodiment. For example, the transfer voltage or the brush voltage may also be changed in a state in which the photosensitive drum is electrically grounded and thus the surface potential is made the ground potential (0 V). Further, by directly applying the voltage, a potential relationship between the transfer roller and the photosensitive drum or between the brush member and the photosensitive drum may also be controlled.

Further, in the above-described embodiments, the case where the present invention is applied to the image forming apparatus of the DC charging type was described as an example, but the present invention is not limited to such an embodiment. The present invention is also applicable to an image forming apparatus of an AC charging type in which as the charging voltage, an oscillating voltage in which the DC voltage (discharge component) and the AC voltage (AC component) are superposed with each other.

Further, in the above-described embodiments, as regards the brush voltage, only the DC component was described, but the brush voltage may also be an oscillating voltage in which the DC voltage (DC component) and the AC voltage (AC component) are superposed with each other.

Further, in the above-described embodiments, a constitution in which the photosensitive drum is irradiated with discharge light at the discharging portion by the pre-exposure device as the discharging means was employed, but the present invention is not limited to such an embodiment. For example, a constitution in which fiber chips of a brush member consisting of electroconductive fibers such as a fur brush are contacted to the photosensitive drum and thus the photosensitive drum is electrically discharged may also be employed. Further, the discharging means is provided for the purpose of uniformizing the charging non-uniformity by the charge removal, and therefore, for example, in the case where the charging means by which a degree of the charging non-uniformity is sufficiently small or in the like case, the discharging means does not have to be provided.

Further, in the above-described embodiments, the cleaning operation for the transfer roller was described on the assumption that the cleaning operation is executed in the post-rotation step as the step during the non-image formation. The cleaning operation for the transfer roller can be executed at an arbitrary timing when the timing is a timing during the non-image formation. For example, in the above-described embodiment, the cleaning operation of the transfer roller was executed in the post-rotation step after all the image forming operations of a certain job are ended in the case where the number of sheets outputted for image formation becomes a predetermined threshold or more in the job. On the other hand, in the case where the number of sheets outputted for image formation becomes the predetermined threshold or more during the job, the cleaning operation for the transfer roller can also be executed through extension of the sheet interval or the like.

Further, in the above-described embodiments, as the developer, the toner which is the non-magnetic one component developer was used, but the developer may also be, for example, a magnetic one component developer.

Further, in the above-described embodiments, the present invention was applied to the constitution of the “cleaner-less type” in which the cleaning means dedicated for the photosensitive drum cleaning, but the present invention is not limited to such an embodiment. For example, the present invention is also applicable to a constitution of a “blade cleaning type” in which the cleaning blade contacting the photosensitive drum on a side downstream of the brush contact portion and an upstream side of the charging portion with respect to the rotational direction of the photosensitive drum. Also, in the constitution of the blade cleaning type, it is desired to suppress that the toner moved from the transfer member to the photosensitive member reaches the cleaning portion in a state in which the toner is agglomerated together with the impurity such as the paper powder during the cleaning operation. When such a mixture of the toner with the impurity reaches the cleaning portion, there is a possibility that passing of the toner through the cleaning portion occurs due to catch or the like of the mixture by the cleaning portion and the toner is non-uniformly deposited on the charging member and thus local charging non-uniformity of the photosensitive member occurs. For that reason, application of the present invention to the constitution of the blade cleaning type is also effective. However, it can be said that the present invention achieves a particularly remarkable effect in the constitution of the cleaner-less type in which the toner is directly sent from the brush contact portion to the charging portion.

Further, in the above-described embodiments, the photosensitive member was of the rotatable drum type, but the photosensitive member may only be required to be a rotatable member such as a rotatable endless belt. Further, in the above-described embodiments, the transfer member was the member of the rotatable roller type, but is not limited thereto. For example, the transfer member may also be a pad-like member, a sheet-like member, a brush-like member (fixed brush, rotatable brush roller, or the like) a rotatable endless belt (an urging member contacted to the photosensitive member via the belt may also be provided), and the like. Typically, the transfer member is the rotatable member.

Further, in the above-described embodiments, the charging member was the member of the rotatable roller type, but may also be a brush-like member (rotatable brush roller or the like), a rotatable endless belt, or the like.

According to the present invention, it is possible to suppress the charging non-uniformity due to the toner moved from the transfer member to the photosensitive member during the cleaning operation for the transfer member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-210846 filed on Dec. 18, 2020, which is hereby incorporated by reference herein in its entirety.

What is claimed is:

1. An image forming apparatus comprising:

a rotatable photosensitive member;

a charging member forming a charging portion in contact with the photosensitive member and configured to electrically charge a surface of the photosensitive member at the charging portion;

an electrostatic image forming portion configured to form an electrostatic image on the photosensitive member charged by the charging member;

a developing device configured to form a toner image on the photosensitive member by supplying toner, charged to a normal polarity, to the electrostatic image;

a transfer member forming a transfer portion in contact with the photosensitive member and configured to transfer the toner image from the photosensitive member onto a recording material passing through the transfer portion;

a brush member forming a contact portion in contact with the photosensitive member on a side downstream of the transfer portion and an upstream side of the charging portion with respect to a rotational direction of the photosensitive member;

a brush voltage source configured to apply a voltage to the brush member; and a controller capable of executing a cleaning operation for moving the toner, deposited on the transfer member, from the transfer member onto the surface of the photosensitive member when the recording material is absent at the transfer portion, wherein the controller carries out control so that the cleaning operation includes:

(1) a first operation in which a potential difference is formed between the brush member and the photosensitive member so that electrostatic force acts such that the toner charged to an opposite polarity to the normal charge polarity is moved from the brush member toward the photosensitive member, (2) a second operation in which a potential difference is formed between the brush member and the photosensitive member so that the electrostatic force acts such that the toner charged to the normal charge polarity is moved from the brush member toward the photosensitive member, (3) a third operation in which a potential difference is formed between the charging member and the photosensitive member so that the electrostatic force acts such that the toner charged to the normal charge polarity is moved from the charging member toward the photosensitive member, and (4) a fourth operation in which a potential difference is formed between the developing member and the photosensitive member so that the electrostatic force acts such that the toner charged to the normal charge polarity is moved from the photosensitive member toward the developing member.

2. An image forming apparatus according to claim 1, wherein the controller controls the voltage applied to the brush member by the brush voltage source in the cleaning operation.

3. An image forming apparatus according to claim 1, wherein in the first operation, the controller carries out control so that a voltage which is higher toward a side opposite to a normal polarity side than a potential of the surface of the photosensitive member passed through the transfer portion and reaching the contact portion and at which electric discharge does not occur between the brush member and the photosensitive member is applied to the brush member by the brush voltage source.

4. An image forming apparatus according to claim 1, wherein after the first operation is ended and later, the controller carries out control of the second operation.

5. An image forming apparatus according to claim 4, wherein before a leading end of the surface of the photosensitive member, with respect to the rotational direction of the surface of the photosensitive member, passing through the transfer portion reaches the contact portion in the cleaning operation, the controller carries out control so that the first operation is performed.

6. An image forming apparatus according to claim 1, wherein the brush member includes an electroconductive brush portion fixedly provided.

7. An image forming apparatus according to claim 1, wherein the brush member includes a rotatable electroconductive brush portion, and wherein the brush portion is rotated with rotation of the photosensitive member, or is rotationally driven so that the photosensitive member and the brush portion move in the same direction at the contact portion with or without providing a speed difference relative to a peripheral speed of the photosensitive member or so that the photosensitive member and the brush portion move in opposite directions at the contact portion.

8. An image forming apparatus according to claim 1, wherein when the toner remaining on the surface of the photosensitive member after the toner image is transferred at the transfer portion from the photosensitive member onto the recording material passes through the contact portion, a voltage of the same polarity as the normal polarity is applied to the brush member by the brush voltage source.

9. An image forming apparatus according to claim 1, wherein the toner remaining on the surface of the photosensitive member after the toner image is transferred at the transfer portion from the photosensitive member onto the recording material is collected by the developing device.

10. An image forming apparatus according to claim 1, wherein the toner has average circularity of 0.96 or more.

11. An image forming apparatus according to claim 1, wherein the toner is a one component developer.

12. An image forming apparatus according to claim 1, wherein the brush member has threads, and the density of the threads is between 150-350 kF/inch$^2$.

* * * * *